US012712662B2

(12) United States Patent
Regev et al.

(10) Patent No.: US 12,712,662 B2
(45) Date of Patent: Aug. 18, 2026

(54) CHANNEL AWARE MODULATION ORDER SELECTION

(71) Applicant: QUALCOMM Incorporated, San Diego, CA (US)

(72) Inventors: Aviv Regev, Tel Aviv (IL); Ronen Shaked, Kfar Saba (IL); Shay Landis, Hod Hasharon (IL); Jacob Pick, Mevaseret Zion (IL)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 18/624,917

(22) Filed: Apr. 2, 2024

(65) Prior Publication Data

US 2025/0310022 A1 Oct. 2, 2025

(51) Int. Cl.
*H04L 1/00* (2006.01)

(52) U.S. Cl.
CPC .......... *H04L 1/0003* (2013.01); *H04L 1/0025* (2013.01); *H04L 1/0026* (2013.01)

(58) Field of Classification Search
CPC .... H04L 1/0003; H04L 1/0025; H04L 1/0026
See application file for complete search history.

(56) References Cited

U.S. PATENT DOCUMENTS

2019/0261218 A1* 8/2019 Khoshnevisan ...... H04L 1/0003
2021/0084532 A1* 3/2021 Chen .................... H04L 1/0005

FOREIGN PATENT DOCUMENTS

EP 3850772 B1 * 8/2022 ........... H04W 72/56

* cited by examiner

*Primary Examiner* — Freshteh N Aghdam
(74) *Attorney, Agent, or Firm* — Moore IP

(57) ABSTRACT

Various aspects of the present disclosure generally relate to wireless communication, and to channel aware modulation order selection for wireless communications. For example, a user equipment (UE) may transmit one or more channel-related parameters to a network node. The network node may select a modulation order in accordance with the one or more channel-related parameters and one or more network parameters that are transmitted to the UE. The network node may modulate a bitset in accordance with the modulation order to generate a modulated bitstream that is transmitted to the UE. The UE may select the same modulation order in accordance with the one or more channel parameters and the one or more network parameters received from the network node, such that the UE may demodulate the modulated bitstream in accordance with the modulation order to generate a demodulated bitset.

22 Claims, 7 Drawing Sheets

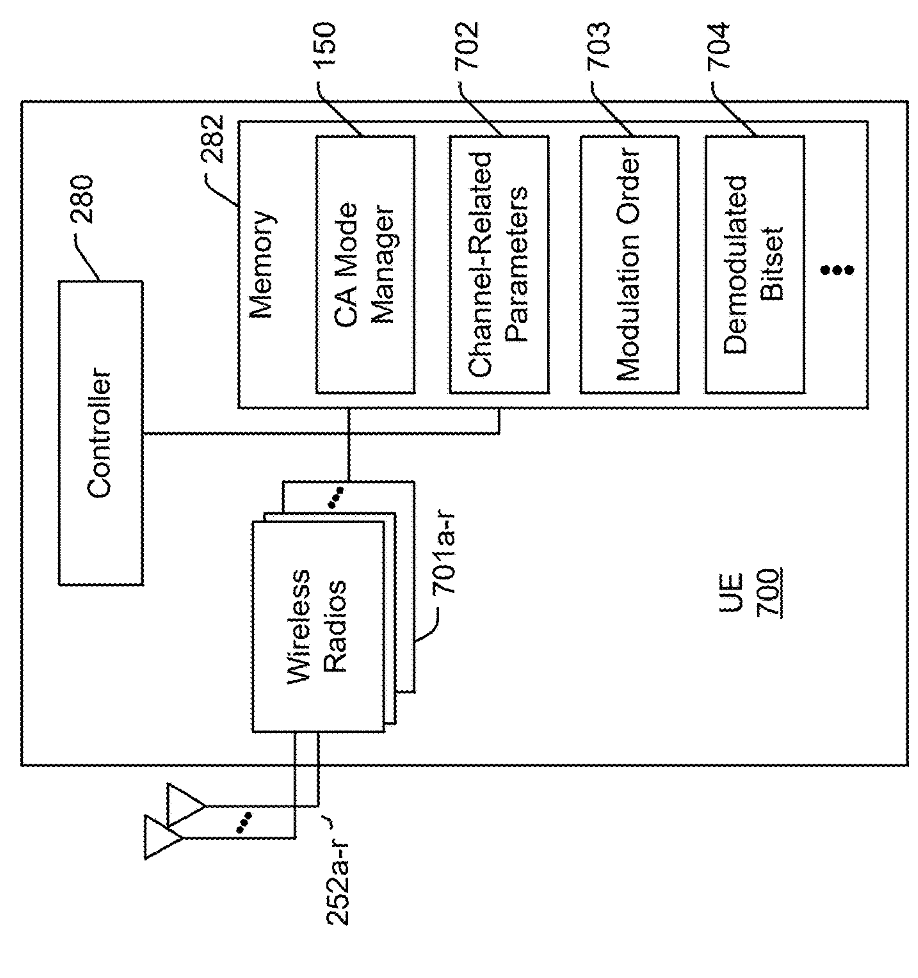

602 Transmit, to a network node, one or more channel-related parameters associated with a wireless channel between the UE and the network node 604 Receive, from the network node, one or more network parameters 606 Select a modulation order in accordance with the one or more channel-related parameters and the one or more network parameters 608 Receive, from the network node and in accordance with the transmission of the one or more channel-related parameters, a modulated bitstream 610 Demodulate the modulated bitstream in accordance with the modulation order to generate a demodulated bitset

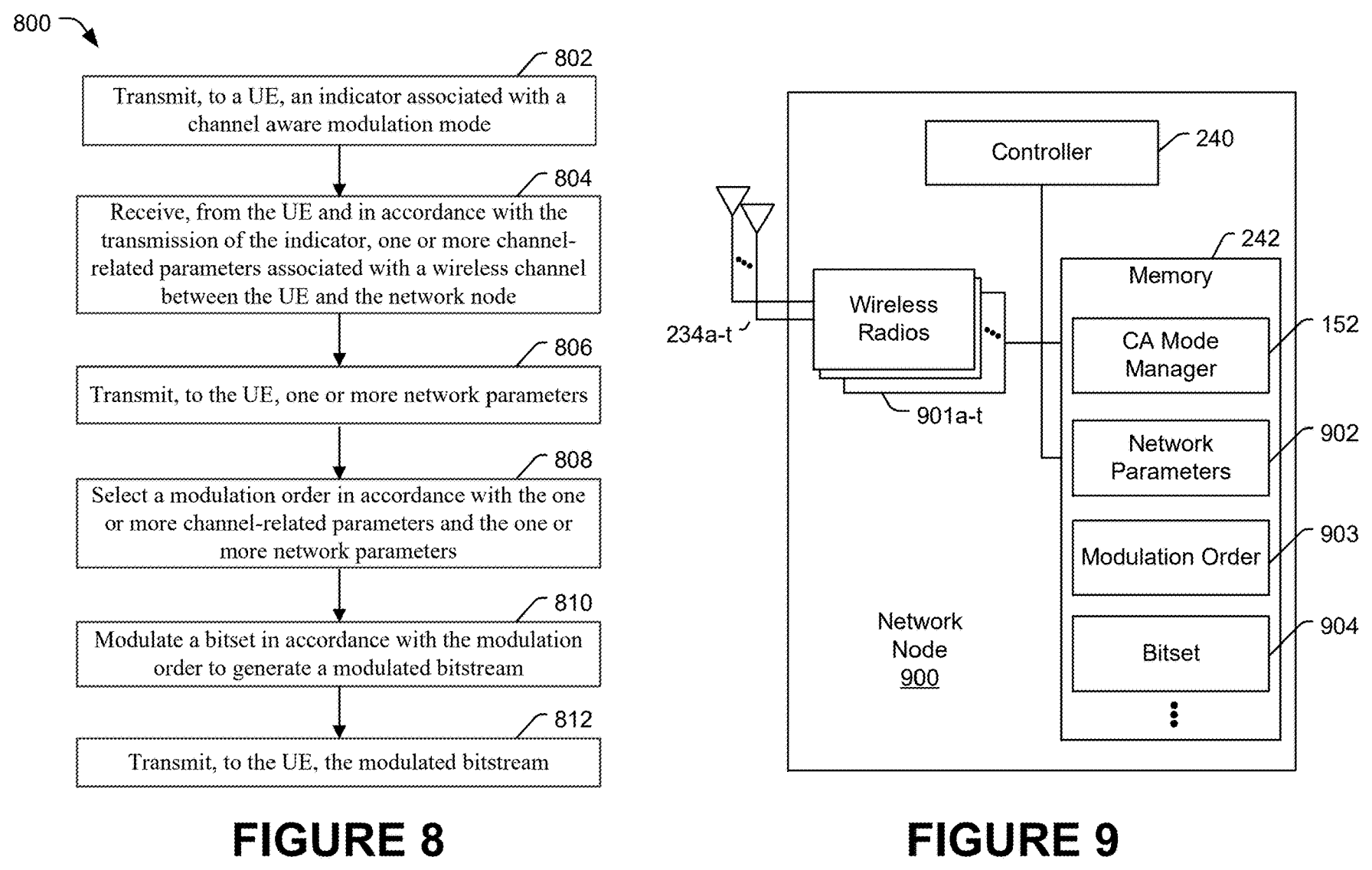

802 Transmit, to a UE, an indicator associated with a channel aware modulation mode 804 Receive, from the UE and in accordance with the transmission of the indicator, one or more channel-related parameters associated with a wireless channel between the UE and the network node 806 Transmit, to the UE, one or more network parameters 808 Select a modulation order in accordance with the one or more channel-related parameters and the one or more network parameters 810 Modulate a bitset in accordance with the modulation order to generate a modulated bitstream 812 Transmit, to the UE, the modulated bitstream

FIGURE 8

240 Controller

242 Memory

152 CA Mode Manager

902 Network Parameters

903 Modulation Order

904 Bitset

Wireless Radios 901a-t 234a-t

Network Node 900

FIGURE 9

CHANNEL AWARE MODULATION ORDER SELECTION

FIELD OF THE DISCLOSURE

Aspects of the present disclosure relate generally to wireless communication systems, and more particularly, to channel aware modulation order selection in wireless communication systems.

BACKGROUND

Wireless communications systems are widely deployed to provide various types of services such as voice, video, packet data, messaging, broadcast, and other types of traffic. The services may include unicast, multicast, and/or broadcast services, among other examples. Typical wireless communication systems may support multiple-access radio access technologies and include a number of base stations or network nodes, each supporting communication for multiple communication devices, which may be otherwise known as user equipment (UE). These systems may be capable of supporting communication with multiple users by sharing available system resources (such as time domain resources, frequency domain resources, spatial domain resources, and device transmit power, among other examples). These systems may employ multiple-access technologies such as code division multiple access (CDMA) technology, time division multiple access (TDMA) technology, frequency division multiple access (FDMA) technology, orthogonal frequency division multiple access (OFDMA) technology, discrete Fourier transform spread orthogonal frequency division multiplexing (DFT-S-OFDM) technology, single-carrier frequency division multiple access (SC-FDMA) technology, and time division synchronous code division multiple access (TD-SCDMA) technology.

The above multiple-access technologies have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, carrier aggregation, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

As wireless communication devices continue to advance, improvements such as adaptive communication modes and optimizations increase the number of possible operating modes with the goal of improving device performance and user experience, such as by increasing data rates, coverage, and spectral efficiency. However, increasing the number of operating modes also increases the amount of control bits communicated to initiate and configure these additional operating modes. Because many of these operating modes are adaptive to frequently changing conditions, the corresponding control bits may be communicated often to enable adaptive operating mode and configuration changes. In some instances, the control bits can be communicated as frequently as during each slot. Because of the frequency of communicating the control bits, the control bits are often communicated at the physical (PHY) layer, such as via a physical downlink control channel (PDCCH) from a network node to a UE. However, in many wireless communication systems, the bandwidth for the PDCCH per user is limited. In such cases, increasing the bandwidth allocated to the PDCCH uses bandwidth that would otherwise be allocated to downlink (DL) data transmissions, which reduces throughput.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Some aspects described herein relate to a user equipment (UE) for wireless communication. The UE includes a processing system that includes one or more processors and one or more memories coupled with the one or more processors. The processing system is configured to cause the UE to transmit, to a network node, one or more channel-related parameters associated with a wireless channel between the UE and the network node. The processing system is also configured to cause the UE to receive, from the network node, one or more network parameters. The processing system is configured to cause the UE to select a modulation order in accordance with the one or more channel-related parameters and the one or more network parameters. The processing system is also configured to cause the UE to receive, from the network node and in accordance with the transmission of the one or more channel-related parameters, a modulated bitstream. The processing system is further configured to cause the UE to demodulate the modulated bitstream in accordance with the modulation order to generate a demodulated bitset.

Some aspects described herein relate to a method of wireless communication performed by a UE. The method includes transmitting, to a network node, one or more channel-related parameters associated with a wireless channel between the UE and the network node. The method also includes receiving, from the network node, one or more network parameters. The method includes selecting a modulation order in accordance with the one or more channel-related parameters and the one or more network parameters. The method also includes receiving, from the network node and in accordance with the transmission of the one or more channel-related parameters, a modulated bitstream. The method further includes demodulating the modulated bitstream in accordance with the modulation order to generate a demodulated bitset.

Some aspects described herein relate to a network node for wireless communication. The network node includes a processing system that includes one or more processors and one or more memories coupled with the one or more processors. The processing system is configured to cause the network node to transmit, to a UE, an indicator associated with a channel aware modulation mode. The processing system is also configured to cause the network node to receive, from the UE and in accordance with the transmission of the indicator, one or more channel-related parameters associated with a wireless channel between the UE and the network node. The processing system is configured to cause the network node to transmit, to the UE, one or more network parameters. The processing system is also configured to cause the network node to select a modulation order in accordance with the one or more channel-related parameters and the one or more network parameters. The processing system is configured to cause the network node to modulate a bitset in accordance with the modulation order to generate a modulated bitstream. The processing system is further configured to cause the network node to transmit, to the UE, the modulated bitstream.

Some aspects described herein relate to a method of wireless communication performed by a network node. The method includes transmitting, to a UE, an indicator associated with a channel aware modulation mode. The method also includes receiving, from the UE and in accordance with the transmission of the indicator, one or more channel-related parameters associated with a wireless channel between the UE and the network node. The method includes transmitting, to the UE, one or more network parameters. The method also includes selecting a modulation order in accordance with the one or more channel-related parameters and the one or more network parameters. The method includes modulating a bitset in accordance with the modulation order to generate a modulated bitstream. The method further includes transmitting, to the UE, the modulated bitstream.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, methods, and computer-readable media.

BRIEF DESCRIPTION OF THE DRAWINGS

A further understanding of the nature and advantages of the present disclosure may be realized by reference to the following drawings. In the appended figures, similar components or features may have the same reference label and designations. Further, various components of the same type may be distinguished by following the reference label by a dash and a second label that distinguishes among the similar components, or by following the reference label with a letter. If just the first reference label is used in the specification, the description is applicable to any one of the similar components having the same first reference label irrespective of the second reference label or letter.

FIG. 6 is a flow diagram illustrating an example process that supports channel aware modulation order selection in accordance with the present disclosure.

FIG. 7 is a block diagram of an example UE that supports channel aware modulation order selection in accordance with the present disclosure.

FIG. 8 is a flow diagram illustrating an example process that supports channel aware modulation order selection in accordance with the present disclosure.

FIG. 9 is a block diagram of an example network node that supports channel aware modulation order selection in accordance with the present disclosure.

DETAILED DESCRIPTION

Figure 1:
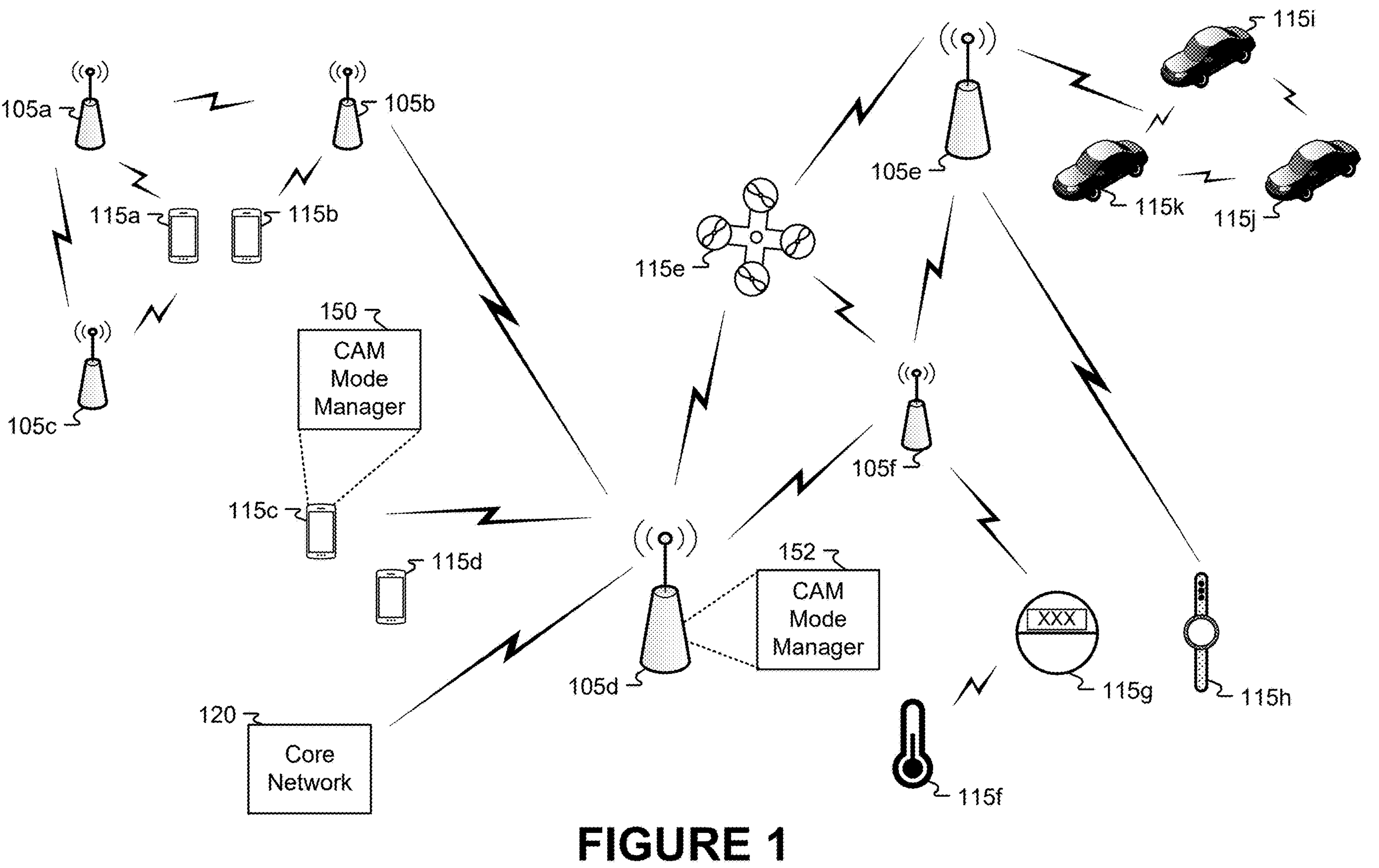
FIG. 1 is a block diagram illustrating details of an example wireless communication network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

The present disclosure provides systems, apparatus, methods, and computer-readable media for channel aware modulation order selection for wireless communication systems. Some aspects more specifically relate to a user equipment (UE) and a network node sharing various parameters in accordance with each device selects a modulation order for use in modulating, or demodulating, a wirelessly communicated bitstream. For example, in some aspects, a network node may transmit, to a UE, a channel aware modulation (CAM) mode indicator and one or more network parameters. The network parameters may include a guard gap threshold or a transmit signal power associated with the network node, as non-limiting examples. In accordance with receiving the CAM mode indicator, the UE may measure, and transmit to the network node, one or more channel-related parameters associated with a wireless channel between the UE and the network node, such as an uplink (UL) channel. The channel-related parameters may include a noise power associated with a receive antenna of the UE, a signal to noise ratio (SNR), or other channel-related parameters. The UE and the network node may each select a modulation order, such as constellation order of a modulation and coding scheme (MCS), in accordance with the channel-related parameters and the network parameters. In some implementations, the UE and the network node may determine a capacity metric in accordance with the channel-related parameters and the network parameters, and the selected modulation order may be associated with a respective capacity threshold that is satisfied by the capacity metric. After selecting the modulation order, the network node may modulate a bitset in accordance with its selected modulation order to generate a modulated bitstream that is sent to the UE, and which the UE may demodulate in accordance with its selected modulation order.

Particular implementations of the subject matter described in this disclosure can be implemented to realize one or more of the following potential advantages. In some aspects, the present disclosure provides techniques for increasing the modulation order of wireless communications, particular communication of control information via a physical downlink control channel (PDCCH), when channel conditions support a higher modulation order. Increasing the modulation order of downlink control information (DCI) in a PDCCH enables an increased amount of control information to be provided to UEs per bandwidth (BW) or enables a reduction in the BW used for control information, which enables additional wireless resources to be allocated to downlink data transmission. In this way, the described techniques improve the data rate and spectral efficiency in wireless communication networks while also enabling UEs to operate in an increased number of operating modes (such as advanced, adaptive operating modes).

This disclosure relates generally to providing or participating in authorized shared access between two or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, 5th Generation (5G) or new radio (NR) networks (sometimes referred to as "5G NR" networks, systems, or devices), as well as other communications networks. As described herein, the terms "networks" and "systems" may be used interchangeably.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV). 5G NR networks contemplate diverse deployments, diverse spectrum, and diverse services and devices that may be implemented using an OFDM-based unified, air interface.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust mm Wave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 gigahertz (GHz) FDD or TDD implementations, subcarrier spacing may occur with 15 kilohertz (kHz), for example over 1, 5, 10, 20 megahertz (MHz), and the like bandwidth. For other various outdoor and small cell coverage deployments of TDD greater than 3 GHZ, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases. For clarity, certain aspects of the present disclosure may be described below with reference to example 5G NR implementations or in a 5G-centric way, and 5G terminology may be used as illustrative examples in portions of the description below; however, the description is not intended to be limited to 5G applications.

FIG. 1 is a block diagram illustrating details of an example wireless communication network 100 in accordance with the present disclosure. The wireless communication network 100 may, for example, be or include elements of a 5G (or NR) network or a 6G network, among other examples. As appreciated by those skilled in the art, components appearing in FIG. 1 are likely to have related counterparts in other network arrangements including, for example, cellular-style network arrangements and non-cellular-style-network arrangements, such as device-to-device, peer-to-peer, or ad hoc network arrangements, among other examples.

The wireless communication network 100 illustrated in FIG. 1 includes multiple network nodes 105, also referred to as network entities, and multiple user equipments (UEs) 115. A network node may be a station that communicates with UEs and may be referred to as a base station, an evolved node B (eNB), a next generation eNB (gNB), an access point, and the like. Each network node 105 may provide communication coverage for a particular geographic area. In 3GPP, the term "cell" can refer to this particular geographic coverage area of a network node or a network node subsystem serving the coverage area, depending on the context in which the term is used. In implementations of the wireless communication network 100 herein, the network nodes 105 may be associated with a same operator or different operators, such as the wireless communication network 100 may include a plurality of operator wireless networks. In some examples, an individual network node 105 or UE 115 may be operated by more than one network operating entity. In some other examples, each network node 105 and UE 115 may be operated by a single network operating entity.

The network nodes 105 and the UEs 115 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHZ through 24.25 GHZ), FR4a or FR4-1 (52.6 GHz through 71 GHz), FR4 (52.6 GHz through 114.25 GHZ), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, in accordance with user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 105 may include one or more devices, components, or systems that enable communication between a UE 115 and one or more devices, components, or systems of the wireless communication network 100. A network node 105 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 105 may be a device or system that implements part of a radio protocol stack, a device or system that implements a full radio protocol stack (such as a full gNB protocol stack), or a collection of devices or systems that collectively implement the full radio protocol stack. For example, and as shown, a network node 105 may be an aggregated network node (having an aggregated architecture), meaning that the network node 105 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 115 and a core network 120 of the wireless communication network 100.

Alternatively, a network node 105 may be a disaggregated network node (sometimes referred to as a disaggregated base station), meaning that the network node 105 may implement a radio protocol stack that is physically distributed and/or logically distributed among two or more nodes in the same geographic location or in different geographic locations. For example, a disaggregated network node may have a disaggregated architecture. In some deployments, disaggregated network nodes 105 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 105 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 115, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 115.

In some aspects, a single network node 105 may include a combination of one or more CUs, one or more DUs, and/or one or more RUs. Additionally or alternatively, a network node 105 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 105 (for example, a base station, an RU, or a TRP) may provide communication coverage for a particular geographic area. In the 3GPP, the term "cell" can refer to a coverage area of a network node 105 or to a network node 105 itself, depending on the context in which the term is used. A network node 105 may support one or multiple (for example, three) cells. In some examples, a network node 105 may provide communication coverage for a macro cell, a pico cell, a femto cell, or another type of cell. A macro cell may cover a relatively large geographic area (for example, several kilometers in radius) and may allow unrestricted access by UEs 115 with service subscriptions. A pico cell may cover a relatively small geographic area and may allow unrestricted access by UEs 115 with service subscriptions. A femto cell may cover a relatively small geographic area (for example, a home) and may allow restricted access by UEs 115 having association with the femto cell (for example, UEs 115 in a closed subscriber group (CSG)). A network node 105 for a macro cell may be referred to as a macro network node. A network node 105 for a pico cell may be referred to as a pico network node. A network node 105 for a femto cell may be referred to as a femto network node or an in-home network node. In some examples, a cell may not necessarily be stationary. For example, the geographic area of the cell may move according to the location of an associated mobile network node 105 (for example, a train, a satellite base station, an unmanned aerial vehicle, or an NTN network node).

The wireless communication network 100 may be a heterogeneous network that includes network nodes 105 of different types, such as macro network nodes, pico network nodes, femto network nodes, relay network nodes, aggregated network nodes, and/or disaggregated network nodes, among other examples. In the example shown in FIG. 1, network nodes 105*d* and 105*e* are regular macro network nodes, while network nodes 105*a*-105*c* are macro network nodes enabled with one of 3 dimension (3D), full dimension (FD), or massive MIMO. Network nodes 105*a*-105*c* take advantage of their higher dimension MIMO capabilities to exploit 3D beamforming in both elevation and azimuth beamforming to increase coverage and capacity. Network node 105*f* is a small cell network node which may be a home node or portable access point. A network node may support one or multiple cells, such as two cells, three cells, four cells, and the like. Various different types of network nodes 105 may generally transmit at different power levels, serve different coverage areas, and/or have different impacts on interference in the wireless communication network 100 than other types of network nodes 105. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 105 may be, may include, or may operate as an RU, a TRP, or a base station that communicates with one or more UEs 115 via a radio access link (which may be referred to as a "Uu" link). The radio access link may include a downlink and an uplink. "Downlink" (or "DL") refers to a communication direction from a network node 105 to a UE 115, and "uplink" (or "UL") refers to a communication direction from a UE 115 to a network node 105. Downlink channels may include one or more control channels and one or more data channels. A downlink control channel may be used to transmit downlink control information (DCI) (for example, scheduling information, reference signals, and/or configuration information) from a network node 105 to a UE 115. A downlink data channel may be used to transmit downlink data (for example, user data associated with a UE 115) from a network node 105 to a UE 115. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 115 to a network node 105. An uplink data channel may be used to transmit uplink data (for example, user data associated with a UE 115) from a UE 115 to a network node 105. Uplink control channels may include one or more physical uplink control channels (PUCCHs), and uplink data channels may include one or more physical uplink shared channels (PUSCHs). The downlink and the uplink may each include a set of resources on which the network node 105 and the UE 115 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 115. A UE 115 may be configured with both an uplink BWP and a downlink BWP (where the uplink BWP and the downlink BWP may be the same BWP or different BWPs). A BWP may be dynamically configured (for example, by a network node 105 transmitting a DCI configuration to the one or more UEs 115) and/or reconfigured, which means that a BWP can be adjusted in real-time (or near-real-time) in accordance with changing network conditions in the wireless communication network 100 and/or in accordance with the specific requirements of the one or more UEs 115. This enables more efficient use of the available frequency domain resources in the wireless communication network 100 because fewer frequency domain resources may be allocated to a BWP for a UE 115 (which may reduce the quantity of frequency domain resources that a UE 115 is required to monitor), leaving more frequency domain resources to be spread across multiple UEs 115. Thus, BWPs may also assist in the implementation of lower-capability UEs 115 by facilitating the configuration of smaller bandwidths for communication by such UEs 115.

As described above, in some aspects, the wireless communication network 100 may be, may include, or may be included in, an IAB network. In an IAB network, at least one network node 105 is an anchor network node that communicates with the core network 120. An anchor network node 105 may also be referred to as an IAB donor (or "IAB-donor"). The anchor network node 105 may connect to the core network 120 via a wired backhaul link. For example, an Ng interface of the anchor network node 105 may terminate at the core network 120. Additionally or alternatively, an anchor network node 105 may connect to one or more devices of the core network 120 that provide a core access and mobility management function (AMF). An IAB network also generally includes multiple non-anchor network nodes 105, which may also be referred to as relay network nodes or simply as IAB nodes (or "IAB-nodes"). Each non-anchor network node 105 may communicate directly with the anchor network node 105 via a wireless backhaul link to access the core network 120, or may communicate indirectly with the anchor network node 105 via one or more other non-anchor network nodes 105 and associated wireless backhaul links that form a backhaul path to the core network 120. Some anchor network nodes 105 or other non-anchor network nodes 105 may also communicate directly with one or more UEs 115 via wireless access links that carry access traffic. In some examples, network resources for wireless communication (such as time resources, frequency resources, and/or spatial resources) may be shared between access links and backhaul links.

The wireless communication network 100 may support synchronous or asynchronous operation. For synchronous operation, the network nodes may have similar frame timing, and transmissions from different network nodes may be approximately aligned in time. For asynchronous operation, the network nodes may have different frame timing, and transmissions from different network nodes may not be aligned in time. In some scenarios, networks may be enabled or configured to handle dynamic switching between synchronous or asynchronous operations.

The UEs 115 are physically dispersed throughout the wireless communication network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile phone, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A UE 115 may additionally be an "Internet of Things" (IoT) or "Internet of Everything" (IoE) device, an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples. The UEs 115 may also include digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115_a_-115_d_ of the implementation illustrated in FIG. 1 are examples of mobile smart phone-type devices accessing the wireless communication network 100. A UE may be a machine specifically configured for connected communication, including machine type communication (MTC), enhanced MTC (eMTC), narrowband IoT (NB-IoT) and the like. The UEs 115_e_-115_k_ illustrated in FIG. 1 are examples of various machines configured for communication that access the wireless communication network 100.

A mobile apparatus, such as the UEs 115, may be able to communicate with any type of the network nodes, whether macro network nodes, pico network nodes, femto network nodes, macro base stations, pico base stations, femto base stations, relays, and the like. In FIG. 1, a communication link (represented as a lightning bolt) indicates wireless transmissions between a UE and a serving network node, which is a network node designated to serve the UE on the downlink or uplink, wireless transmissions between network nodes, and backhaul transmissions between network nodes. Backhaul communication between network nodes of the wireless communication network 100 may occur using wired or wireless communication links.

In some examples, two or more UEs 115 (for example, shown as UE 115_i_ and UE 115_j_) may communicate directly with one another using sidelink communications (for example, without communicating by way of a network node 105 as an intermediary). As an example, the UE 115_i_ may directly transmit data, control information, or other signaling as a sidelink communication to the UE 115_j_. This is in contrast to, for example, the UE 115_i_ first transmitting data in a UL communication to a network node 105, which then transmits the data to the UE 115_j_ in a DL communication. In various examples, the UEs 115 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 105 may schedule and/or allocate resources for sidelink communications between UEs 115 in the wireless communication network 100. In some other deployments and configurations, a UE 115 (instead of a network node 105) may perform, or collaborate or negotiate with one or more other UEs to perform, scheduling operations, resource selection operations, and/or other operations for sidelink communications.

In some examples, the UEs 115 and the network nodes 105 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

As an example of operation at the wireless communication network 100, the network nodes 105_a_-105_c_ serve the UEs 115_a_ and 115_b_ using 3D beamforming and coordinated spatial techniques, such as coordinated multipoint (COMP) or multi-connectivity. Macro network node 105_d_ performs backhaul communications with the network nodes 105_a_-105_c_, as well as with the small cell network node 105_f_. Macro network node 105_d_ also transmits multicast services which are subscribed to and received by the UEs 115_c_ and 115_d_. Such multicast services may include mobile television or streaming video, or may include other services for providing community information, such as weather emergencies or alerts, such as Amber alerts or gray alerts.

The wireless communication network 100 of implementations supports mission critical communications with ultra-reliable and redundant links for mission critical devices, such the UE 115_e_, which is a drone. Redundant communication links with the UE 115_e_ include communication links from the macro network nodes 105_d_ and 105_e_, as well as the small cell network node 105_f_. Other machine type devices, such as UE 115_f_ (thermometer), the UE 115_g_ (smart meter), and the UE 115_h_ (wearable device) may communicate through the wireless communication network 100 either directly with network nodes, such as the small cell network node 105_f_ and the macro network node 105_e_, or in multi-hop configurations by communicating with another user device which relays its information to the network, such as the UE 115_f_ communicating temperature measurement information to the UE 115_g_, which is then reported to the network through the small cell network node 105_f_. The wireless communication network 100 may provide additional network efficiency through dynamic, low-latency TDD or FDD communications, such as in a vehicle-to-vehicle (V2V) mesh network between the UEs 115_i_-115_k_ communicating with the macro network node 105_e_.

In some aspects, one or more of the network nodes 105 and one or more of the UEs may perform wireless communications that support channel aware modulation order selection. For example, one or more of the UEs 115 (such as the UE 115_c_) may include a CAM mode manager 150 and one or more of the network nodes 105 (such as the network node 105_d_) may include a CAM mode manager 152 that manage operations that support channel aware modulation order selection. The operations may include communicating one or more channel-related parameters from a UE 115 to a network node 105, communicating one or more network parameters with from the network node 105 to the UE 115, and selecting a modulation order for modulating, or demodulating, a bitstream in accordance with the one or more channel-related parameters and the one or more network parameters, as further described herein with reference to FIG. 4.

Figure 2:
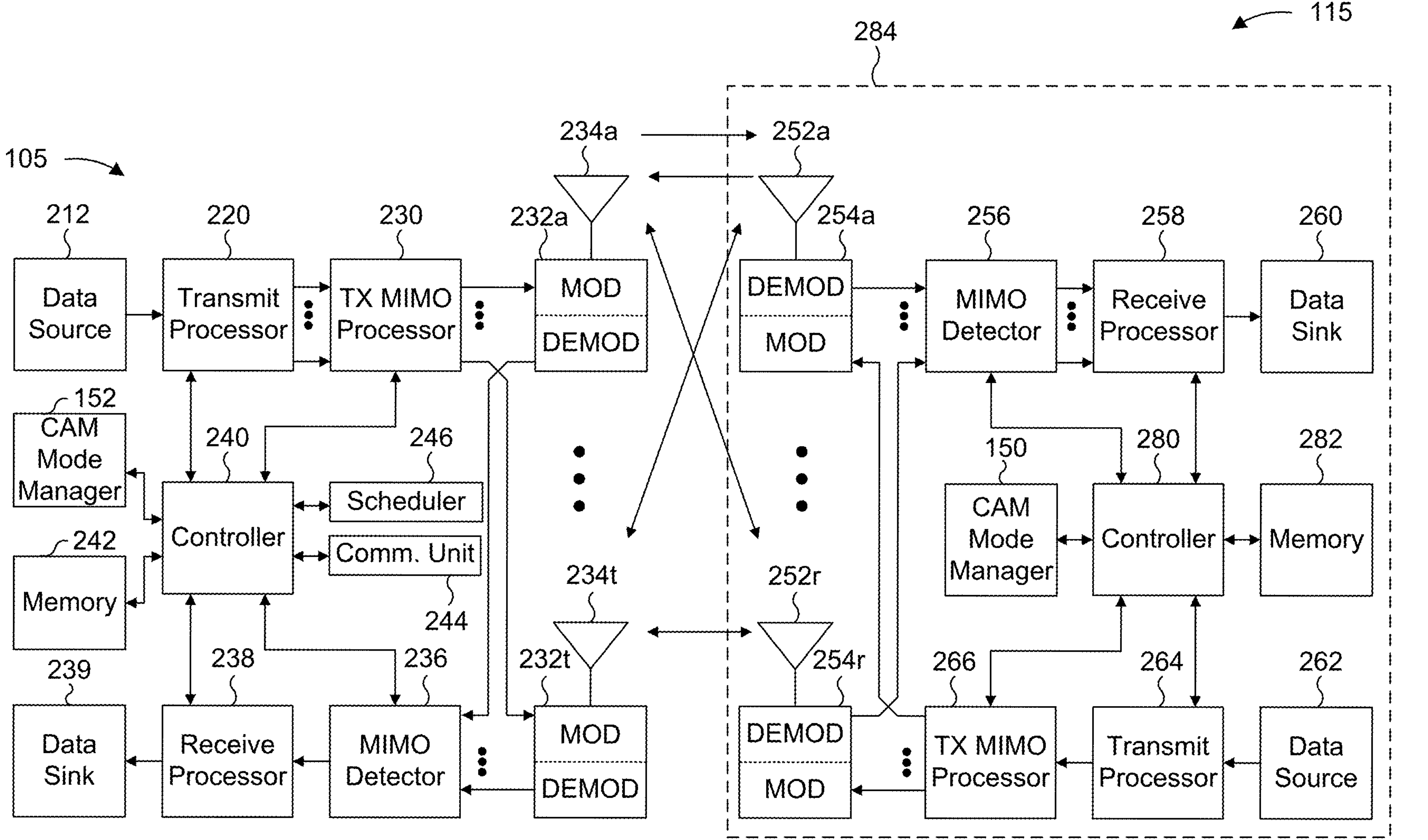
FIG. 2 is a block diagram illustrating examples of a network node and a user equipment (UE) in accordance with the present disclosure.

FIG. 2 is a block diagram illustrating examples of a network node 105 and a UE 115 in accordance with the present disclosure. The network node 105 and the UE 115 may be one of the network nodes 105 and one of the UEs 115 in FIG. 1. For a restricted association scenario (as mentioned above), the network node 105 may be the small cell network node 105_f_ in FIG. 1, and the UE 115 may be the UE 115_c_ or 115_d_ operating in a service area of the network node 105_f_, which in order to access the small cell network node 105_f_, would be included in a list of accessible UEs for the small cell network node 105_f_. Additionally, the network node 105 may be a base station or network entity of some other type. As shown in FIG. 2, the network node 105 may be equipped with antennas 234a through 234t, and the UE 115 may be equipped with antennas 252a through 252r for facilitating wireless communications.

For downlink communication from the network node 105 to the UE 115, a transmit processor 220 may receive data ("downlink data") from a data source 212 (such as a data pipeline or a data queue) and control information from a controller 240. The control information may be for the physical broadcast channel (PBCH), physical control format indicator channel (PCFICH), physical hybrid-ARQ (automatic repeat request) indicator channel (PHICH), PDCCH, enhanced physical downlink control channel (EPDCCH), or MTC physical downlink control channel (MPDCCH), among other examples. The data may be for the PDSCH, among other examples. The transmit processor 220 may process, such as encode and symbol map, such as in accordance with a selected modulation and coding scheme (MCS), the data and control information to obtain data symbols and control symbols, respectively. Additionally, the transmit processor 220 may generate reference symbols for reference signals, such as for a cell-specific reference signal (CRS), a demodulation reference signal (DMRS), or a channel state information (CSI) reference signal (CSI-RS) and/or synchronization signals, such as for a primary synchronization signal (PSS) or a secondary synchronization signal (SSS).

Transmit (TX) multiple-input multiple-output (MIMO) processor 230 may perform spatial processing on the data symbols, the control symbols, and/or the reference symbols, if applicable, and may provide output symbol streams to modems 232a through 232t. For example, each output symbol stream may be provided to a respective modulator component (shown as MOD) of a modem 232. In some examples, spatial processing performed on the data symbols, the control symbols, and/or the reference symbols may include precoding. Each modem 232 may use the respective modulator component to process a respective output symbol stream, such as for OFDM, among other examples, to obtain an output sample stream. Each modem 232 may additionally or alternatively use the respective modulator component to process the output sample stream to obtain a downlink signal. For example, to process the output sample stream, each modem 232 may use the respective modulator component to convert to analog, amplify, filter, and upconvert the output sample stream to obtain the downlink signal. The modems 232a through 232t may together transmit a set of downlink signals from via the antennas 234a through 234t, respectively.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

At the UE 115, the antennas 252a through 252r may receive the downlink signals from the network node 105 and may provide a set of received signals to modems 254a through 254r. For example, each received signal may be provided to a respective demodulator component (shown as DEMOD) of a modem 254. Each modem 254 may use the respective demodulator component to condition a respective received signal to obtain input samples. For example, to condition the respective received signal, the demodulator component of each modem 254 may filter, amplify, downconvert, and/or digitize the respective received signal to obtain the input samples. Each modem 254 may use the respective demodulator component to further process the input samples, such as for OFDM, among other examples, to obtain received symbols. MIMO detector 256 may obtain received symbols from modems 254a through 254r, perform MIMO detection on the received symbols if applicable, and provide detected symbols. Receive processor 258 may process the detected symbols, provide decoded data for the UE 115 to a data sink 260 (which may include a data pipeline, a data queue, and/or an application executed on the UE 115), and provide decoded control information to a controller 280. For example, to process the detected symbols, the receive processor 258 may demodulate, deinterleave, and decode the detected symbols.

In some aspects, one or a combination of the antenna(s) 252, the modem(s) 254, the MIMO detector 256, the receive processor 258, the transmit processor 264, or the TX MIMO processor 266 may be included in a transceiver that is included in the UE 115. The transceiver may be under control of and used by one or more processors, such as the controller 280, and in some aspects in conjunction with processor-readable code stored in the memory 282, to perform aspects of the methods, processes, or operations described herein. In some aspects, the UE 115 may include another interface, another communication component, and/or another component that facilitates communication with the network node 105 and/or another UE 115. Additionally, or alternatively, one or more of the components of the UE 115 may be included in a housing 284.

For uplink communications from the UE 115 to the network node 105, a transmit processor 264 may receive and process data ("uplink data") from a data source 262 and control information (such as for the PUCCH) from the controller 280. The control information may include one or more parameters, feedback, one or more signal measurements, and/or other types of control information. In some aspects, the receive processor 258 and/or the controller 280 may determine, for a received signal (such as received from the network node 105 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 115 by the network node 105.

The transmit processor 264 may generate reference symbols for a reference signal, such as an uplink DMRS, an uplink sounding reference signal (SRS), and/or another type of reference signal. The symbols from the transmit processor 264 may be precoded by TX MIMO processor 266, if applicable, and further processed by the modems 254*a* through 254*r* (such as for DFT-s-OFDM or CP-OFDM, among other examples). The TX MIMO processor 266 may perform spatial processing (for example, precoding) on the data symbols, the control symbols, and/or the reference symbols, if applicable, and may provide a set of output symbol streams to the modems 254. For example, each output symbol stream may be provided to a respective modulator component (shown as MOD) of a modem 254. Each modem 254 may use the respective modulator component to process a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*r* may transmit a set of uplink signals via the corresponding antennas 252*a* through 252*r*, respectively. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 115) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

At network node 105, the uplink signals from the UE 115 may be received by antennas 234*a* through 234*t*, processed by demodulator components of the modems 232*a* through 232*t*, detected by MIMO detector 236 if applicable, and further processed by receive processor 238 to obtain decoded data and/or control information sent by the UE 115. The receive processor 238 may provide the decoded data to a data sink 239 (which may be a data pipeline, a data queue, and/or another type of data sink) and provide the decoded control information to the controller 240.

The controllers 240 and 280 may direct the operation at the network node 105 and the UE 115, respectively. The controller 240 (or other processors and modules at the network node 105) or the controller 280 (or other processors and modules at the UE 115) may perform or direct the execution of various processes for the techniques described herein, such as to perform or direct the execution illustrated in FIGS. 6 and 8, or other processes for the techniques described herein. For example, the controller 240 and/or the controller 280 may perform or control operations that support channel aware modulation order selection. Additionally, or alternatively, the UE 115 may include the CAM mode manager 150 and the network node 105 may include the CAM mode manager 152 that manage operations to support channel aware modulation order selection, as further described herein. Although referred to as "controllers", the controllers 240 and 280 may include one or more processors and/or one or more controllers, and also or in the alternative be referred to as "processors" or "controller/processors". In some aspects, a single processor may perform all of the operations described as being performed by the one or more processors or the one or more controllers. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors.

The memories 242 and 282 may store data and program codes for the network node 105 and the UE 115, respectively. Reference to "one or more memories" should be understood to refer to any one or more memories of a corresponding device, such as the memory described in connection with FIG. 2. For example, an operation described as being performed by one or more memories can be performed by the same subset of the one or more memories or different subsets of the one or more memories.

The network node 105 may use scheduler 246 to schedule one or more UEs 115 for downlink or uplink communications. In some aspects, the scheduler 246 may use DCI to dynamically schedule DL transmissions to the UE 115 and/or UL transmissions from the UE 115. In some examples, the scheduler 246 may allocate recurring time domain resources and/or frequency domain resources that the UE 115 may use to transmit and/or receive communications using an RRC configuration (for example, a semi-static configuration), for example, to perform semi-persistent scheduling (SPS) or to configure a configured grant (CG) for the UE 115.

In some examples, the network node 105 may use communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 105 may use the communication unit 244 to transmit and/or receive data associated with the UE 115 or to perform network control signaling, among other examples. The communication unit 244 may include a transceiver and/or an interface, such as a network interface.

One or more antennas of the antennas 252 or the antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 115 or network nodes 105 may include different numbers of antenna elements. For example, a UE 115 may include a single antenna element, two antenna elements, four antenna elements, eight antenna elements, or a different number of antenna elements. As another example, a network node 105 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

Figure 3:
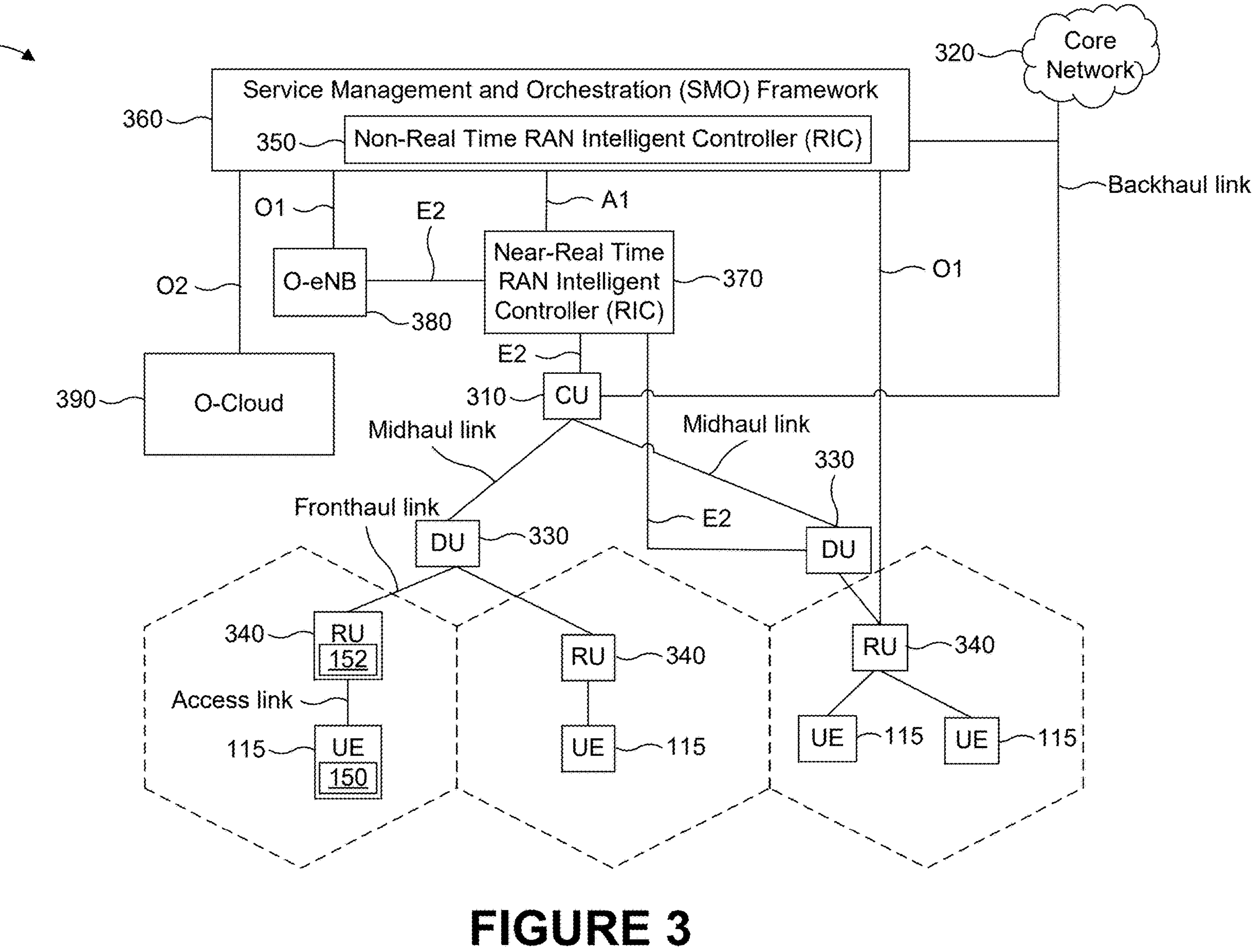
FIG. 3 is a block diagram illustrating an example disaggregated base station architecture in accordance with the present disclosure.

FIG. 3 is a block diagram illustrating an example disaggregated base station architecture 300 in accordance with the present disclosure. One or more components of the example disaggregated base station architecture 300 may be, may include, or may be included in one or more network nodes (such as one or more network nodes 105). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). In some implementations, the core network 320 includes or corresponds to the core network 120 of FIG. 1. The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 115 via respective RF access links. In some deployments, a UE 115 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The UE 115, the CU 310, the DU 330, the RU 340, or any other component(s) of FIG. 3 may implement one or more techniques or perform one or more operations associated with channel aware modulation order selection, as described in more detail elsewhere herein. For example, the UEs 115 may include the CAM mode manager 150 and the RU 340 may include the CAM mode manager 152, which may manage operations to support channel aware modulation order selection. Although shown in FIG. 3 as being included in a single UE 115 in FIG. 3, any of the UEs 115 may include the CAM mode manager 150, and although shown as being included in a single RU 340 in FIG. 3, any of the RUs 340, the DUs 330, the CUs 310, the Non-RT RIC 350, the SMO Framework 360, the Near-RT RIC 370, or a combination thereof, may include the CAM mode manager 152. The CAM mode managers 150 and 152 may direct operations of, for example, process 600 of FIG. 6, process 800 of FIG. 8, or other processes as described herein (alone or in conjunction with one or more other processors). In some examples, the CAM mode manager 150 or the CAM mode manager 152 may include, or have access to, a non-transitory computer-readable medium storing a set of instructions (for example, code or program code) for wireless communication. The memory may include one or more memories, such as a single memory or multiple different memories (of the same type or of different types). For example, the set of instructions, when executed (for example, directly, or after compiling, converting, or interpreting) by the CAM mode manager 150, the CAM mode manager 152, one or more processors of the network node 105, the UE 115, the CU 310, the DU 330, the RU 340, the Non-RT RIC 350, the SMO Framework 360, or the Near-RT RIC 370, may cause the one or more processors or the CAM mode manager 150 and 152 to perform process 600 of FIG. 6, process 800 of FIG. 8, or other processes as described herein. In some examples, executing instructions may include running the instructions, converting the instructions, compiling the instructions, and/or interpreting the instructions, among other examples.

Figure 4:
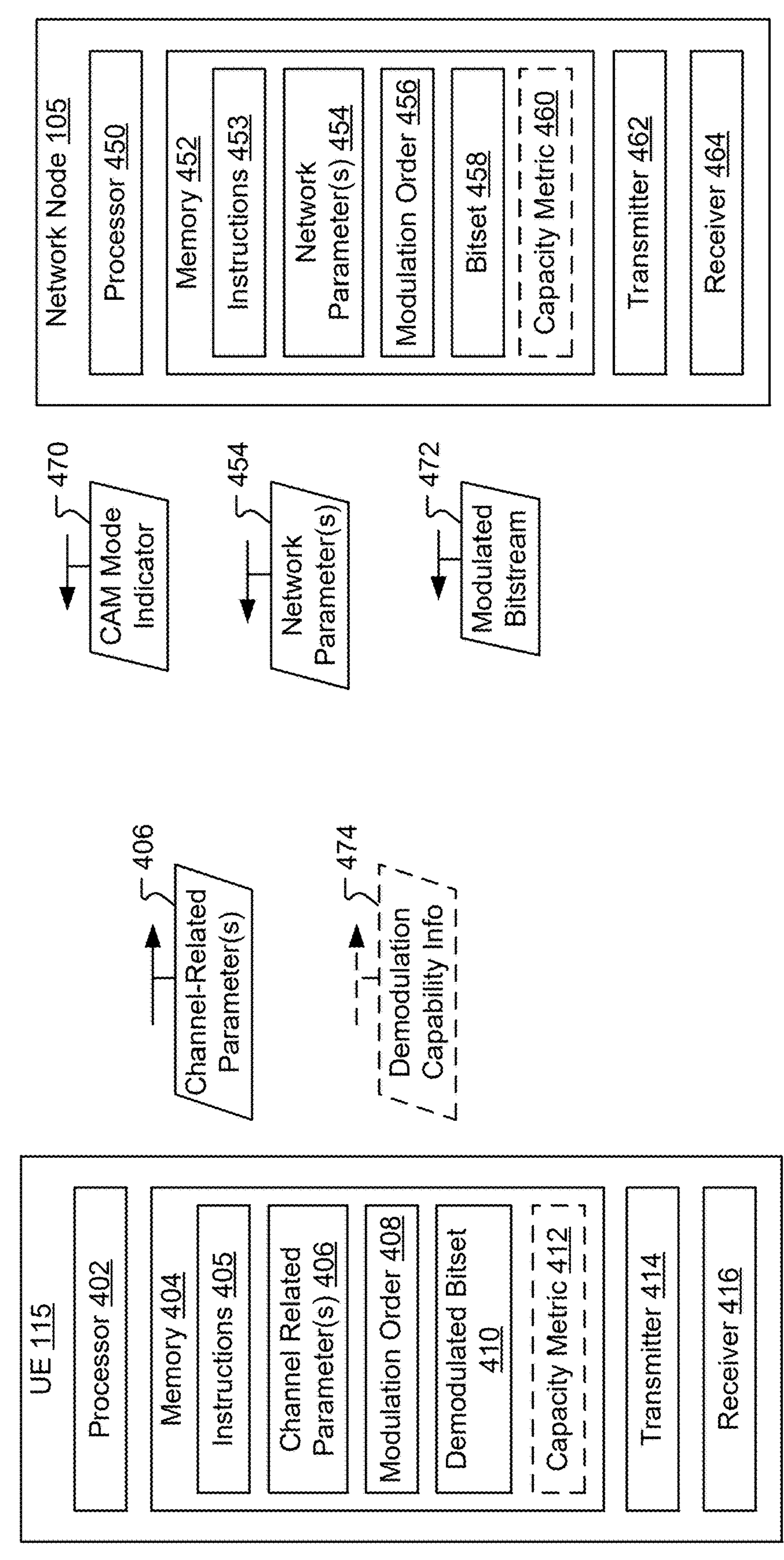
FIG. 4 is a block diagram illustrating an example of a wireless communication system that supports channel aware modulation order selection in accordance with the present disclosure.

FIG. 4 is a block diagram illustrating an example wireless communication system 400 that supports channel aware modulation order selection in accordance with the present disclosure. In some examples, the wireless communication system 400 may implement aspects of the wireless communication network 100. The wireless communication system 400 includes the UE 115 and the network node 105. Although one UE 115 and one network node 105 are illustrated, in some other implementations, the wireless communication system 400 may generally include multiple UEs 115, multiple network nodes 105, or both.

The UE 115 can include a variety of components (such as structural, hardware components) used for carrying out one or more functions described herein. For example, these components can include one or more processors 402 (hereinafter referred to collectively as "the processor 402"), one or more memory devices 404 (hereinafter referred to collectively as "the memory 404"), one or more transmitters 414 (hereinafter referred to collectively as "the transmitter 414"), and one or more receivers 416 (hereinafter referred to collectively as "the receiver 416"). Although referred to as a processor, the UE 115 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor 402" or "the processor circuitry").

One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions. The processor 402 may be configured to execute instructions 405 stored in the memory 404 to perform the operations described herein. In some implementations, the processor 402 includes or corresponds to one or more of the receive processor 258, the transmit processor 264, and the controller 280, and the memory 404 includes or corresponds to the memory 282, described with reference to FIG. 2. In some implementations, the processor 402, the memory 404, the instructions 405, another component of the UE 115, or a combination thereof, may include or correspond to the CAM mode manager 150 of FIGS. 1-3 and/or may perform the operations associated with the CAM mode manager 150 to support channel aware modulation order selection.

The memory 404 may be configured to store one or more channel-related parameters 406 (hereinafter referred to collectively as "the channel-related parameters 406"), a modulation order 408, a demodulated bitset 410, and optionally, a capacity metric 412. The channel-related parameters 406 may represent one or more conditions of a wireless channel between the UE 115 and the network node 105, as measured by the UE 115. The modulation order 408 may include a modulation order selected by the UE 115 for use in demodulating bitstreams received from the network node 105, as further described herein. The demodulated bitset 410 may include a bitset generated by demodulating an incoming bitstream at the UE 115. The capacity metric 412 may be a metric that represents a capacity of the wireless channel between the UE 115 and the network node 105. In some other implementations, the capacity metric 412 is omitted, or is replaced with a different type of metric, as further described herein.

The transmitter 414 is configured to transmit reference signals, control information and data to one or more other devices, and the receiver 416 is configured to receive reference signals, synchronization signals, control information and data from one or more other devices. For example, the transmitter 414 may transmit signaling, control information and data to, and the receiver 416 may receive signaling, control information and data from, the network node 105. In some implementations, the transmitter 414 and the receiver 416 may be integrated in one or more transceivers. Additionally or alternatively, the transmitter 414 or the receiver 416 may include or correspond to one or more components of the UE 115 described with reference to FIG. 2.

The network node 105 can include a variety of components (such as structural, hardware components) used for carrying out one or more functions described herein. For example, these components can include one or more processors 450 (hereinafter referred to collectively as "the processor 450"), one or more memory devices 452 (hereinafter referred to collectively as "the memory 452"), one or more transmitters 462 (hereinafter referred to collectively as "the transmitter 462"), and one or more receivers 464 (hereinafter referred to collectively as "the receiver 464"). Although referred to as a processor, the network node 105 may include one or more chips, SoCs, chipsets, packages, or devices that individually or collectively constitute or comprise a processing system. The processing system includes processor (or "processing") circuitry in the form of one or multiple processors, microprocessors, processing units (such as CPUs, GPUs, NPUs and/or DSPs), processing blocks, ASICs, PLDs (such as FPGAs), or other discrete gate or transistor logic or circuitry (all of which may be generally referred to herein individually as "processors" or collectively as "the processor 450" or "the processor circuitry").

One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions. The processor 450 may be configured to execute instructions 453 stored in the memory 452 to perform the operations described herein. In some implementations, the processor 450 includes or corresponds to one or more of the receive processor 238, the transmit processor 220, and the controller 240, and the memory 452 includes or corresponds to the memory 242, described with reference to FIG. 2. In some implementations, the processor 450, the memory 452, the instructions 453, another component of the network node 105, or a combination thereof, may include or correspond to the CAM mode manager 152 of FIGS. 1-3 and/or may perform the operations associated with the CAM mode manager 152 to support channel aware modulation order selection.

The memory 452 may be configured to store one or more network parameters 454 (hereinafter referred to collectively as "the network parameters 454"), a modulation order 456, a bitset 458, and optionally, a capacity metric 460. The network parameters 454 may represent one or more aspects of modulation to be performed by the network node 105 for communications to the UE 115. The modulation order 456 may include a modulation order selected by the network node 105 for use in modulating the bitset 458 for transmission to the UE 115, as further described herein. The bitset 458 may include control information to be transmitted to the UE 115, such as DCI. The capacity metric 460 may be a metric that represents a capacity of the wireless channel between the UE 115 and the network node 105. In some other implementations, the capacity metric 460 is omitted, or is replaced with a different type of metric, as further described herein. In some implementations, the modulation order 456 and the capacity metric 460 determined at the network node 105 are the same as the modulation order 408 and the capacity metric 412, respectively, determined at the UE 115.

The transmitter 462 is configured to transmit reference signals, synchronization signals, control information, and data to one or more other devices, and the receiver 464 is configured to receive reference signals, control information and data from one or more other devices. For example, the transmitter 462 may transmit signaling, control information and data to, and the receiver 464 may receive signaling, control information and data from, the UE 115. In some implementations, the transmitter 462 and the receiver 464 may be integrated in one or more transceivers. Additionally or alternatively, the transmitter 462 or the receiver 464 may include or correspond to one or more components of network node 105 described with reference to FIG. 2.

In some implementations, the wireless communication system 400 implements a 5G NR network or a 6G network. For example, the wireless communication system 400 may include multiple 5G-capable UEs 115 (or 6G-capable UEs 115) and multiple 5G-capable network nodes 105 (or 6G-capable network nodes 105), such as UEs and network nodes configured to operate in accordance with a 5G NR network protocol, or a 6G network protocol, such as that defined by the 3GPP.

During operation of the wireless communication system 400, the network node 105 may initiate a channel aware modulation selection (CAM) mode with the UE 115, such as by transmitting a CAM mode indicator 470 to the UE 115. For example, the CAM mode indicator 470 may be a message that indicates a request for the UE 115 to perform channel aware modulation selection in accordance with a CAM mode, or the CAM mode indicator 470 may be a field, a bit, or another type of indicator in an existing message. The CAM mode indicator 470 may indicate a request by the network node 105 for the channel-related parameters 406, and optionally, for demodulation capabilities of the UE 115. In some implementations, the network node 105 transmits the CAM mode indicator 470 as part of an initialization of communications with the UE 115, such as during an association process or an attachment process of the UE 115 to the wireless communication system 400. In some implementations, the CAM mode indicator 470 may be communicated at the MAC level, such that the CAM mode indicator 470 is, or is included in, a MAC control element (MAC-CE). Additionally, or alternatively, the UE 115 may transmit an ACK if the UE 115 supports the CAM mode in accordance with receiving the CAM mode indicator 470. In some other implementations, the network node 105 and the UE 115 are preconfigured to perform channel aware modulation selection, and the CAM mode indicator 470 may be omitted.

As part of a channel aware modulation selection process, the UE 115 measures the channel-related parameters 406 associated with a wireless channel between the UE 115 and the network node 105. As non-limiting examples, the channel-related parameters 406 include a noise power associated with a receive antenna of the UE 115, a signal to noise ratio (SNR) across one or more resource elements (REs) of the wireless channel, a mutual information value associated with transmission and reception via the wireless channel, other channel-related parameters, or a combination thereof. The channel-related parameters 406 measured or estimated by the UE 115 may correspond to the metric or technique being used to select the modulation order 408. For example, if the modulation order 408 is being selected based on capacity (the capacity metric 412), the UE 115 may measure or estimate the noise power associated with the receive antenna as the channel-related parameters 406. In this example, the UE 115 may estimate the noise power from a DL slot according to Equation 1 below, where y, $\hat{H}$ and X are a received signal (such as a DMRS pilot), the DL channel, and the transmitted signal, respectively.

$$\widehat{noise} = y - \hat{H}x \quad \text{Equation 1}$$

In this example, the UE 115 transmits the antenna noise to the network node 105 as the channel-related parameters 406, and the network node 105 may estimate the SNR at the UE 115 according to Equation 2 below, where signal is represented by $\hat{H}$x in Equation 1.

$$SNR = |\text{signal}|^2/|\text{noise}|^2 \quad \text{Equation 2}$$

Alternatively, the UE 115 may determine the SNR at the UE 115 to send to the network node 105 as the channel-related parameters 406. In other implementations, the channel-related parameters 406 include one or more mutual information values associated with transmission and reception via the wireless channel, and the network node 105 may be able to estimate the wireless channel based on the symmetricity of mutual information. For example, the mutual information may be expressed in terms of entropy of the wireless channel and may be related to the joint entropy of the channel input (measurable at the network node 105) and the channel output (measurable at the UE 115).

In some implementations, the SNR and/or the channel estimation are the same for both directions of wireless communication channels between the UE 115 and the network node 105. For example, the UL channel and the DL channel may be reciprocal if both the UL channel and the DL channel occupy bandwidths in higher frequency bands. In higher frequency bands, such as 6 GHz and above, different channels may be substantially reciprocal such that reciprocity can be assumed for channel estimations without introducing significant errors. The scenario of channel reciprocity is more likely in extensions of 5G NR and in next generation 6G networks in which communication channels may occupy BW in FR3 as part of a giga MIMO (gMIMO) configuration. In implementations in which the UL channel and the DL channel are not reciprocal, the UE 115 may provide an UL channel estimation to the network node instead of the channel-related parameters 406, although this may significantly increase overhead in the wireless communication system 400.

After measuring or estimating the channel-related parameters 406, the UE 115 transmits the channel-related parameters 406 to the network node 105. In some implementations, the UE 115 may transmit the channel-related parameters 406 to the network node 105 every N slots, where N may be 1, 2, 4, or 8 depending on a subcarrier spacing (SCS). Because N may be relatively small, in some implementations the UE 115 communicates the channel-related parameters 406 at the PHY level. In some implementations in which the channel-related parameters 406 include the antenna noise of the UE 115, the channel-related parameters 406 are included in a channel state feedback (CSF) report, such as an additional parameter in the CSF report that is changed at a relatively low rate. Communicating the channel-related parameters 406 at the PHY level may be preferrable to other techniques, such as communicating the channel-related parameters 406 at the MAC level, such as using MAC-CEs, or using radio resource configuration (RRC) messages. However, in other implementations, the UE 115 can communicate the channel-related parameters 406 via one or more MAC-CEs or one or more RRC messages.

As part of the channel aware modulation selection process, the network node 105 transmits the network parameters 454 to the UE 115. The network parameters 454 include parameters known to the network node 105 that affect the selection of a modulation and coding scheme (MCS) and/or the modulation order used to modulate signals communicated by the network node 105. As non-limiting examples, the network parameters 454 include a guard gap threshold (also referred to as TH) associated with determining a channel capacity, a transmit signal power (TX power) associated with the network node 105, other network parameters, or a combination thereof. The network parameters 454 may be preconfigured at the network node 105, adaptively selected by the network node 105, or measured or estimated by the network node 105.

The network node 105 may transmit the network parameters 454 after, or with, the CAM mode indicator 470. For example, initial values of the network parameters 454 may be included in one or more MAC-CEs (either the same MAC-CE(s) as the CAM mode indicator 470 or different MAC-CE(s)). Additionally, or alternatively, the network node 105 may communicate the network parameters 454 at the PHY level, such as via DCI or other control information. The network parameters 454 may change over time, and the network node 105 may send updated parameter values to the UE 115 when the parameter values change or at fixed intervals, such as every N slots. Because the network parameters 454 may change frequently, the network node 105 may be configured to communicate the network parameters 454 at the PHY level.

After communication of the channel-related parameters 406 and the network parameters 454 between the UE 115 and the network node 105, the UE 115 and the network node 105 may each select a respective modulation order (the modulation order 408 and the modulation order 456, respectively) in accordance with the channel-related parameters 406 and the network parameters 454. For example, the UE 115 and the network node 105 may perform one or more calculations using the channel-related parameters 406 and the network parameters 454 to generate a metric that is indicative of a highest modulation order that can be supported by the wireless channel. In some implementations, the UE 115 and the network node 105 may compare the respective metric to thresholds associated with set of one or more modulation orders, such as a preconfigured set of candidate modulation orders, to select the modulation order associated with the highest threshold that is satisfied by the metric, as further described herein. Because the modulation order 408 selected by the UE 115 and the modulation order 456 selected by the network node 105 are selected in accordance with the same parameters and metrics, and rely on channel reciprocity, the modulation order 408 and the modulation order 456 are the same. As such, the network node 105 does not signal the modulation order 456 to the UE 115, which reduces overhead within the wireless communication system 400 as compared to requiring such signaling.

The modulation orders 408 and 456, which may also be referred to as constellation orders, indicate a constellation in which information is encoded within symbols according to an MCS. A higher order modulation order is associated with a higher order constellation in which each symbol is capable of storing more encoded information than symbols of a lower order constellation. As non-limiting examples, the modulation orders 408 and 456 may include quadrature phase shift keying (QPSK), 8 quadrature amplitude modulation (QAM-8), 16 quadrature amplitude modulation (QAM-16), 32 quadrature amplitude modulation (QAM-32), 64 quadrature amplitude modulation (QAM-64), or 128 quadrature amplitude modulation (QAM-128). QAM is higher order modulation than QPSK, and higher numbers of QAM schemes are higher order than lower numbers of QAM schemes. Thus, by selection of the modulation order 408 and 456, a PDCCH between the network node 105 and the UE 115 may be configured with a QPSK modulation scheme or with a higher order QAM scheme.

In many other wireless networks, the PDCCH is configured with a low modulation order, particularly QPSK, to protect “critical” information conveyed over the PDCCH in any scenario, including at cell edges where the interference of neighbor network nodes may be almost as strong as the received signal power of communications from the serving network node. This signal strength of neighbor network nodes at cell edges can result in a low SNR, such as a negative SNR of −6 dB as a non-limiting example, which may not support modulation orders higher than QPSK. However, most UEs 115 are not at the cell edge, or do not remain at the cell edge for an extended amount of time, and thus channel conditions are likely to be better than this worst-case scenario at the cell edge for most UEs 115 at most times. Thus, having a fixed configuration of the PDCCH to be modulated using QPSK fails to take advantage of typical channel conditions, which may support higher modulation orders than QPSK. By selecting the modulation orders 408 and 456 in accordance with the channel-related parameters 406 and other parameters, the wireless communication system 400 adaptively increases the modulation order used for wireless communications, particularly for DCI via a PDCCH, when channel conditions permit higher modulation orders than a fixed worst-case modulation order.

In some implementations, prior to selection of the modulation orders 408 and 456, the UE 115 transmits demodulation capability information 474 to the network node 105. The UE 115 may select the modulation order 408, and the network node 105 may select the modulation order 456, further in accordance with the demodulation capability information 474, as further described herein. As non-limiting examples, the demodulation capability information 474 includes a demodulator type used at the UE 115, a demodulator implementation loss associated with the demodulator used at the UE 115, other demodulation capabilities or information, or a combination thereof. In some implementations, the UE 115 may select a demodulator to use from multiple types of available demodulators, including “enhanced” demodulator types such as a per-stream recursive demapping (PSRD) demodulator and “simple” demodulator types such as a linear minimum mean square error (LMMSE) demodulator. The enhanced demodulator types may have a smaller demodulation implementation loss than the simple demodulator types. For example, advanced UEs can perform demodulation with very small implementation loss, with each UE having its own hardware with its own demodulation capabilities (such as a PSRD demodulator), while older UEs can perform demodulation with a higher SNR loss. The UE 115 may track an upper bound of the implementation loss for each demodulator type supported at the UE 115, and the demodulation capability information 474 may include the demodulator types and/or the demodulation implementation losses (which may be in terms of bits or dBs).

In some implementations, the demodulation capability information 474 is sent by the UE 115 during the initialization of communications with the network node 105, such as during an association process. If the UE 115 is sending the demodulation capability information 474 during the initialization of communications, the UE 115 may transmit the demodulation capability information 474 using one or more MAC-CEs or otherwise via the MAC layer. If any of the demodulation capabilities change, the UE 115 may update the demodulation capability information 474 and transmit the updated information to the network node 105 as UCI sent via a PUCCH to the network node 105 or as uplink data sent via a PUSCH to the network node 105. In some implementations, demodulation capabilities of the UE 115 change based on restrictions imposed by other operations or aspects of the UE 115. For example, if the UE 115 detects a low battery or otherwise enters a low power operating mode, the UE 115 may reduce processing resources associated with a demodulation process, such as by changing a demodulator type from an enhanced demodulator type to a simple demodulator type, which may increase the implementation loss. Accordingly, the UE 115 may update the demodulation capability information 474 to represent the increased implementation loss to the network node 105.

As described above, the UE 115 and the network node 105 may select the modulation orders 408 and 456, respectively, based on a variety of different metrics. One example of modulation order selection is based on capacity. In some implementations, the network node 105 may determine the capacity metric 460 in accordance with the channel-related parameters 406 and the network parameters 454, and the network node 105 may select the modulation order 456 from a set of modulation orders in accordance with the capacity metric 460. In some implementations, each modulation order of a set of modulation orders is association with a capacity threshold, and the network node 105 may select one of the set of modulation orders associated with a highest capacity threshold that is satisfied by the capacity metric 460 as the modulation order 456.

In capacity-based modulation order selection implementations, the network node 105 may determine a capacity threshold for each of the set of candidate modulation orders and the capacity metric 460 using Equation 3 below, which is based on the Telatar expression using an assumption that noise at the receive antennas of the UE 115 is white noise, and in which C is the capacity, $I_{Nss \times Nss}$ is the mutual information between the input and the output of the channel, $SNR_{DL}$ is the ratio between the transmitted signal power of the network node 105 and the noise power associated with the receive antennas of the UE 115, and H is the channel.

$$C = \log_2 \left| I_{NssxNss} + SNR_{DL} \cdot H^H H \right| \quad \text{Equation 3}$$

Although Equation 3 assumes uncorrelated transmitted data, the capacity resulting from Equation 3 is an upper bound to the capacity performance for the channel. In some implementations, any downlink reception performed by the UE 115, including demodulation and decoding, may have implementation losses which can degrade the upper bound of the capacity performance, as described above. Accordingly, in these implementations, the capacity thresholds of the set of modulation orders are determined further in accordance with the demodulation capability information 474 to account for any changes to the upper bounds due to implementation losses at the UE 115.

The network node 105 may determine a capacity threshold for each of the set of modulation orders according to the channel-related parameters 406, the network parameters 454, and the demodulation capabilities information 474. For example, each capacity threshold (each minimal channel capacity required by the respective modulation order) may be calculated according to Equation 4 below, where $N_b$ is the number of bits that each symbol represents at the given modulation order, R is the operated code rate associated with the modulation order, L is the demodulator implementation losses associated with the UE 115, and TH is an added guard gap that may be selected in accordance with network policy (such as selecting a more or less conservative gap) and design or configuration of the wireless communication system 400.

$$C_{min} = N_b \cdot R + L + TH \quad \text{Equation 4}$$

Presented below is Table 1, which includes example capacity threshold values for various modulation orders using Equation 4 and illustrative parameter values of R=0.75, L=1, and TH=0.5.

TABLE 1

Example Capacity Thresholds

| Modulation Order (Constellation) | $N_b$ | Uncoded Bits | $C_{min}$ (Capacity Threshold) |
|---|---|---|---|
| QPSK | 2 | 1.5 | 3 |
| QAM-16 | 4 | 3 | 4.5 |
| QAM-64 | 6 | 4.5 | 6 |

After generating the capacity thresholds for the set of candidate modulation orders, the network node 105 may calculate the capacity metric 460 for the wireless channel at the occupied BW using Equation 3, and the network node 105 may select the candidate modulation order having the largest capacity threshold that is satisfied by the capacity metric 460 as the modulation order 456. For example, if the capacity metric 460 is 6.5, the network node 105 may select QAM-64 as the modulation order 456. As another example, if the capacity metric 460 is 3.9, the network node 105 may select QAM-16 as the modulation order 456. The network node 105 may recalculate the capacity metric 460, and reselect the modulation order 456, when one or more of the underlying parameters changes. The UE 115 determines the capacity metric 412 and selects the modulation order 408 in the same manner as described above for the network node 105 determining the capacity metric 460 and selecting the modulation order 456. Because the capacity metric 412 determined by the UE 115 and the capacity metric 460 determined by the network node 105 are determined based on the same underlying parameter values, the capacity metric 412 and the capacity metric 460 are the same. Thus, channel capacity is an example metric that may be used by the UE 115 and the network node 105 to take advantage of the channel reciprocity and the DL SNR knowledge to evaluate the channel condition and to select the highest modulation orders supported by the wireless channel at a given time.

Although an example using capacity as a metric to select the modulation orders 408 and 456 has been described, in other implementations, other metrics may be used. For example, other metrics based on mutual information associated with the wireless channel, such as based on the joint entropy of the input to the channel and the output to the channel, may be similarly used to determine thresholds for the set of candidate modulation orders and for determining a metric for use by the UE 115 and the network node 105 in selecting the modulation orders 408 and 456 from the set of candidate modulation orders. In some other implementations, the UE 115, the network node 105, or both, may be configured with one or more artificial intelligence (AI) or machine learning (ML) models that are trained to output a selected modulation order based on one or more input parameters. For example, an AI or ML model may be trained using a training set that includes various values of one or more of the channel-related parameters 406, the network parameters 454, the demodulation capability information 474, other wireless communication parameters, or any combination thereof, to output a prediction of a highest modulation order that is supported by the wireless channel at a given time. The AI or ML model may be trained using labeled training data, such as parameter values labeled with a corresponding modulation order, as part of a supervised learning process, or using a different type of learning process such as a semi-supervised learning process or an unsupervised learning process.

After the network node 105 selects the modulation order 456, the network node modulates information to be sent to the UE 115 in accordance with the modulation order 456. For example, the network node 105 may modulate the bitset 458 in accordance with the modulation order 456 to generate a modulated bitstream 472 for transmission to the UE 115. As an example, if the modulation order 456 is QAM-16, the network node 105 may modulate the bitset using an MCS having a constellation order of QAM-16 to generate the modulated bitstream 472. The bitset 458 may include control information for the UE 115, such that the modulated bitstream 472 includes or corresponds to DCI that may be transmitted via a PDCCH to the UE 115. Because the modulation order 456 may be higher than a worst-case modulation order, for example due to channel conditions indicating a sufficient capacity or other metric, the modulated bitstream 472 may include more control information in the same number of bits as compared to DCI that is modulated in accordance with a worst-case modulation order, such as a modulation order that is expected to support worst-case channel conditions at cell edges or in heavy interference. The network node 105 may use the modulation order 456 to modulate bitsets for the UE 115 until one or more of the underlying parameters to the selection of the modulation order 456 change, such as in updated messaging from the UE 115.

The UE 115 receives the modulated bitstream 472 from the network node 105, such as via a PDCCH between the UE 115 and the network node 105. The UE 115 may demodulate the modulated bitstream 472 in accordance with the modulation order 408 to generate the demodulated bitset 410. As an example, if the modulation order 408 is QAM-16, the UE 115 may demodulate the bitset using an MCS having a constellation order of QAM-16 to generate the demodulated bitset 410. Because the modulation order 408 and the modulation order 456 are the same, the demodulated bitset 410 is a representation of the bitset 458. Additionally, or alternatively, the UE 115 may determine the MCS based on one or more of the network parameters 454, such as the transmit signal power associated with the network node 105. After the demodulation, the UE 115 may perform one or more wireless communication operations in accordance with the information (the DCI) represented by the demodulated bitset 410. For example, the demodulated bitset 410 may indicate one or more wireless resources associated with a downlink data transmission, such as wireless resources associated with a PDSCH, and the UE 115 may monitor the indicated wireless resources to receive downlink data via the PDSCH.

As described with reference to FIG. 4, the present disclosure provides techniques for supporting channel aware modulation order selection. For example, the UE 115 and the network node 105 may select the modulation orders 408 and 456, respectively, in accordance with information shared between the UE 115 and the network node 105, such as at least the channel-related parameters 406 and the network parameters 454. In this manner, the network node 105 may communicate with the UE 115 via messages that are modulated in accordance with higher modulation orders, when channel conditions permit, as compared to using a fixed modulation order for all communications that supports worst-case channel conditions. Thus, the wireless communication system 400 may increase the modulation order of the modulated bitstream 472, which may include DCI communicated via a PDCCH, when the higher modulation order is likely to be received without significant errors due to channel conditions. For example, if the modulation orders 408 and 456 are selected to be 16QAM, instead of QPSK, with the same code rate, the amount of BW used to communicate control bits via a PDCCH is reduced by approximately 50%. Increasing the modulation order of the modulated bitstream 472 (of DCI in a PDCCH) may enable an increased amount of control information to be provided to the UE 115 per BW of the PDCCH or may enable a reduction in the BW used for control information, which may enable additional wireless resources to be allocated to downlink data transmission. For example, if the modulated bitstream 472 is communicated using a portion of the BW designated for control information, a remainder of the BW may be reallocated to data transmissions, thereby increasing the amount of downlink data that may be communicated by the network node 105 to the UE 115 in a particular set of wireless resources. In this way, the wireless communication system 400 improves the data rate and spectral efficiency between the network node 105 and the UE 115, and optionally enables the UE 115 to operate in an increased number of operating modes (such as advanced, adaptive operating modes) that require a significant increase in the amount of control information used to configure the additional operating modes.

Figure 5:
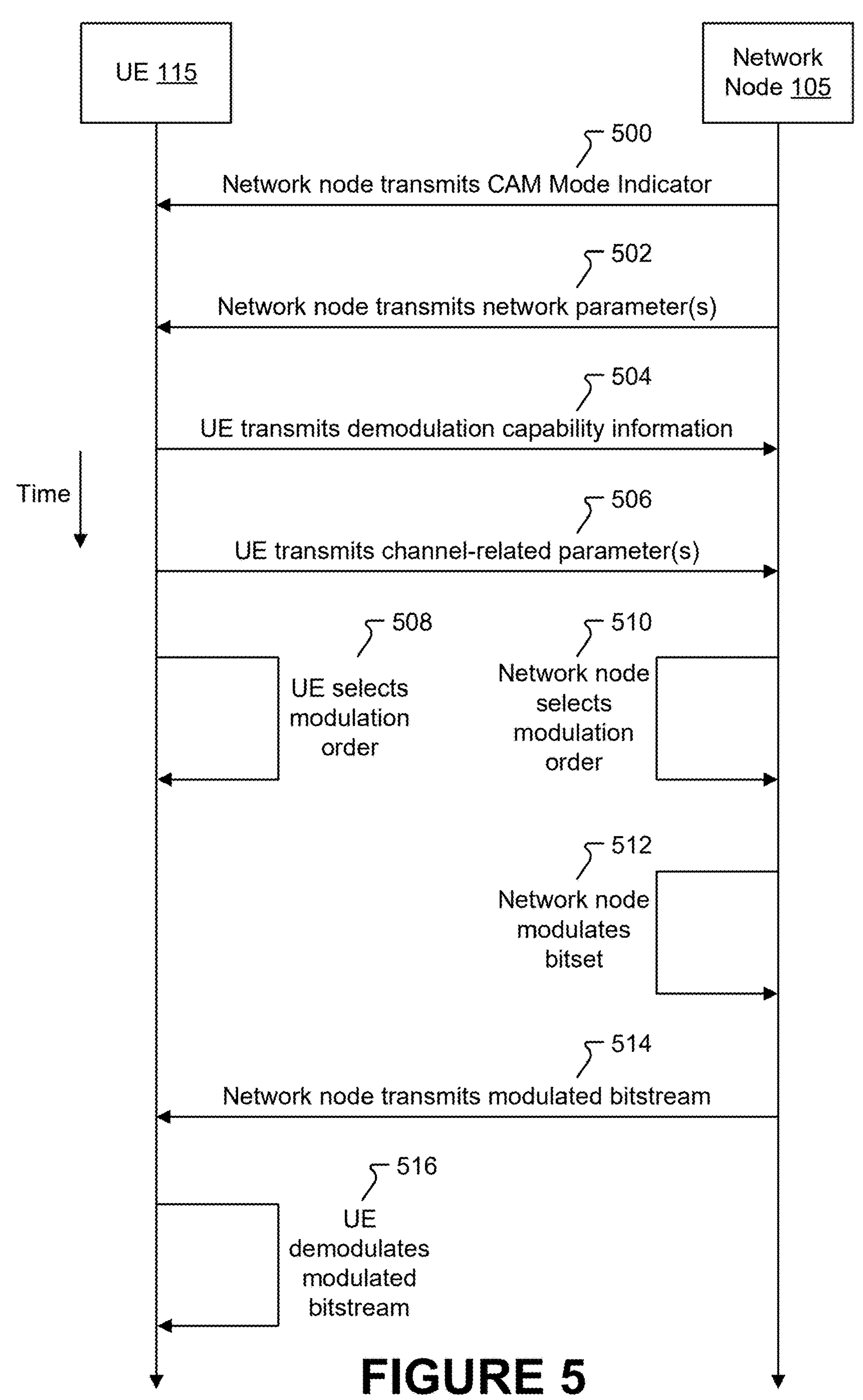
FIG. 5 is a ladder diagram illustrating example wireless communications that support channel aware modulation order selection in accordance with the present disclosure.

FIG. 5 is a ladder diagram illustrating example wireless communications that support channel aware modulation order selection in accordance with the present disclosure. The operations described with reference to FIG. 5 may be performed by the UE 115 and the network node 105 of FIGS. 1-4. Although operations are illustrated in FIG. 5 as respective arrows, the operations described herein may be performed as a single operation or as multiple operations, and may include communication of one or more signals or messages to support the described functionality. Messages and signaling transmitted from the network node 105 to the UE 115 may be referred to as DL communications, and messages or signaling transmitted from the UE 115 to the network node 105 may be referred to as UL communications. Additionally, or alternatively, although a particular order of operations is illustrated and described with reference to FIG. 5, in other implementations, one or more operations may be performed in a different order or partially or wholly concurrently.

The network node 105 transmits a CAM mode indicator to the UE 115 as part of DL communications, at 500. For example, the CAM mode indicator may include or correspond to the CAM mode indicator 470 of FIG. 4. The network node 105 may transmit the CAM mode indicator to the UE 115 to request the UE 115 to share PDCCH demodulation capabilities and noise power, or an SNR, of receive antennas at the UE 115. In some implementations, the network node 105 transmits the CAM mode indicator via one or more MAC-CEs during initialization of communications with the UE 115.

The network node 105 transmits network parameters to the UE 115 as part of DL communications, at 502. For example, the network parameters may include or correspond to the network parameters 454 of FIG. 4. The network parameters may include a guard gap that is used in determining channel capacity, a transmission power of the network node 105, other network parameters, or a combination thereof. In some implementations, because the network parameters change over time and are updated, the network node 105 transmits the network parameters, and any updates, over the PHY level, such as via DCI or other control information via a PDCCH or other control channel.

The UE 115 transmits demodulation capability information to the network node 105 as part of UL communications, at 504. For example, the demodulation capability information may include or correspond to the demodulation capability information 474 of FIG. 4. The demodulation capability information may include a demodulator type of a demodulator currently being used at the UE 115, such as an enhanced type or a simple type, and/or a demodulation implementation loss associated with the demodulator currently being used at the UE 115. In some implementations, the UE 115 transmits initial demodulation capabilities information over the MAC level, such as via one or more MAC-CEs, and the UE 115 transmits updated demodulation capability information via the PUCCH or another control channel.

The UE 115 transmits channel-related parameters to the network node 105 as part of UL communications, at 506. For example, the channel-related parameters may include or correspond to the channel-related parameters 406 of FIG. 4. The channel-related parameters may include particular parameters associated with a metric being used to select modulation order. For example, if the metric is channel capacity, the channel-related parameters may include a noise power level of receive antennas of the UE 115, or an SNR of the receive antennas of the UE 115. In other implementations, the channel-related parameters include other types of parameters related to the UL channel between the UE 115 and the network node 105, such as mutual information associated with the UL channel. In some implementations, the UE 115 transmits the channel-related parameters over the MAC level, such as via one or more MAC-CEs, and the UE 115 updates the channel-related parameters once every N slots. Additionally, or alternatively, the UE 115 may include the channel-related parameters as one or more additional fields in a CSF report.

The UE 115 selects a modulation order in accordance with the channel-related parameters, the network parameters, and the demodulation capability information, at 508. For example, the modulation order may include or correspond to the modulation order 408 of FIG. 4. Similarly, the network node 105 selects a modulation order in accordance with the channel-related parameters, the network parameters, and the demodulation capability information, at 510. For example, the modulation order may include or correspond to the modulation order 456 of FIG. 4. In some implementations, the modulation order is selected from a set of modulation orders that includes QPSK, QAM-8, QAM-16, QAM-32, QAM-64, or QAM-128. In other implementations, the modulation order is selected from a set of modulation orders that includes fewer than six or more than six modulation orders, or that includes different modulation orders that described above.

The UE 115 and the network node 105 may select the modulation orders in accordance with a metric that is generated in accordance with the channel-related parameters, the network parameters, and the demodulation capabilities information, and this metric may be compared to thresholds associated with a set of preconfigured modulation orders (a set of candidate modulation orders) to select the candidate modulation order having the highest threshold that is satisfied by the metric. As a particular example, the metric may be a capacity metric, and the UE 115 and the network node 105 may determine capacity thresholds associated with one or more candidate modulation orders, a capacity metric association with the wireless channel, and the selected modulation order may be the modulation order with the highest candidate threshold that is satisfied (is less than) by the capacity metric, as described above with reference to FIG. 4, and in particular, Equation 3, Equation 4, and Table 1. In other implementations, instead of using capacity, the UE 115 and the network node 105 select the modulation order based on a different metric, such as a different mutual information metric associated with the wireless channel, or using a trained AI or ML model.

The network node 105 modulates a bitset in accordance with the modulation order to generate a modulated bitstream, at 512. For example, the bitset may include or correspond to the bitset 458 of FIG. 4. As an example, if the network node 105 selects QAM-16 as the modulation order, the network node 105 modulates the bitset in accordance with an MCS having QAM-16 as the constellation order.

The network node 105 transmits the modulated bitstream to the UE 115 as part of DL communications, at 514. For example, the modulated bitstream may include or correspond to the modulated bitstream 472 of FIG. 4. Because the modulated bitstream may be modulated in accordance with a higher order modulation order than a fixed modulation order associated with a worst-case channel scenario, such as QPSK, the modulated bitstream may convey more information than conventional modulated bitstreams and/or may occupy less BW than conventional modulated bitstreams that are transmitted via a PDCCH.

The UE 115 demodulates the modulated bitstream in accordance with the modulation order to generate a demodulated bitset, at 516. For example, the demodulated bitset may include or correspond to the demodulated bitset 410 of FIG. 4. Because the UE 115 selects the modulation order it uses to demodulate the modulated bitstream, the network node 105 does not signal the selected modulation order to the UE 115, which may reduce overhead in the wireless communication network.

FIG. 6 is a flow diagram illustrating an example process 600 that supports channel aware modulation order selection in accordance with the present disclosure. Operations of the process 600 may be performed by a UE, such as the UE 115 described above with reference to FIGS. 1-5. For example, example operations (also referred to as "blocks") of the process 600 may enable the UE to perform channel aware modulation order selection, according to some aspects of the present disclosure.

FIG. 7 is a block diagram of an example UE 700 that supports channel aware modulation order selection in accordance with the present disclosure. The UE 700 may be configured to perform operations, including the blocks of the process 600 described with reference to FIG. 6, to perform channel aware modulation order selection. In some implementations, the UE 700 includes the structure, hardware, and components shown and described with reference to the UE 115 of FIG. 2 or 4. For example, the UE 700 includes the controller 280, which operates to execute logic or computer instructions stored in the memory 282, as well as controlling the components of the UE 700 that provide the features and functionality of the UE 700. The UE 700, under control of the controller 280, transmits and receives signals via wireless radios 701*a-r* and the antennas 252*a-r*. The wireless radios 701*a-r* include various components and hardware, as illustrated in FIG. 2 for the UE 115, including the modems 254 *a-r*, the MIMO detector 256, the receive processor 258, the transmit processor 264, and the TX MIMO processor 266.

As shown, the memory 282 may include the CAM mode manager 150, channel-related parameters 702, modulation order 703, and a demodulated bitset 704. Although illustrated in FIG. 7 as being included in the memory 282, in other implementations, the CAM mode manager 150 may be a separate component of the UE 700. The CAM mode manager 150 may be configured to manage one or more operations supporting channel aware modulation selection, such as measuring and transmitting the channel-related parameters 702, selecting the modulation order 703 in accordance with the channel-related parameters 702 and network parameters from a network node, and demodulating a bitstream in accordance with the modulation order 703 to generate the demodulated bitset 704. The channel-related parameters 702 may include or correspond to the channel-related parameters 406 of FIG. 4, the modulation order 703 may include or correspond to the modulation order 408 of FIG. 4, and the demodulated bitset 704 may include or correspond to the demodulated bitset 410 of FIG. 4. The UE 700 may receive signals from or transmit signals to one or more network nodes, such as the network node 105 of FIGS. 1-5 or a network node as illustrated in FIG. 9.

Referring back to the process 600 of FIG. 6, in block 602, the UE 700 transmits, to a network node, one or more channel-related parameters associated with a wireless channel between the UE and the network node. For example, the one or more channel-related parameters may include or correspond to the channel-related parameters 406 of FIG. 4. In some implementations, the wireless channel includes an uplink channel from the UE 700 to the network node having reciprocity with a downlink channel from the network node to the UE 700. In block 604, the UE 700 receives, from the network node, one or more network parameters. For example, the one or more network parameters may include or correspond to the network parameters 454 of FIG. 4.

In block 606, the UE 700 selects a modulation order in accordance with the one or more channel-related parameters and the one or more network parameters. For example, the modulation order may include or correspond to the modulation order 408 of FIG. 4. In block 608, the UE 700 receives, from the network node and in accordance with the transmission of the one or more channel-related parameters, a modulated bitstream. For example, the modulated bitstream may include or correspond to the modulated bitstream 472 of FIG. 4.

In block 610, the UE 700 demodulates the modulated bitstream in accordance with the modulation order to generate a demodulated bitset. For example, the demodulated bitset may include or correspond to the demodulated bitset 410 of FIG. 4. In some implementations, the modulated bitstream is received via a PDCCH and the demodulated bitset includes control information for the UE 700.

In some implementations, the one or more channel-related parameters include a noise power associated with a receive antenna of the UE 700, a SNR across one or more REs of the wireless channel, a mutual information value associated with transmission and reception via the wireless channel, or a combination thereof. Additionally, or alternatively, the one or more network parameters may include a guard gap threshold, a transmit signal power associated with the network node, or a combination thereof. Additionally, or alternatively, the modulation order may include QPSK, QAM-8, QAM-16, QAM-32, QAM-64, or QAM-128.

In some implementations, the process 600 further includes transmitting, to the network node, demodulation capability information including a demodulator type, a demodulator implementation loss, or a combination thereof. For example, the demodulation capability information may include or correspond to the demodulation capability information 474 of FIG. 4. In such implementations, the process 600 also includes selecting the modulation order further in accordance with the demodulation capability information. For example, the UE 700 may select the modulation order 408 in accordance with the channel-related parameters 406, the network parameters 454, and the demodulation capability information 474, as described with reference to FIG. 4.

In some implementations, selecting the modulation order includes determining a capacity metric associated with the wireless channel in accordance with the one or more channel-related parameters and the one or more network parameters. For example, the capacity metric may include or correspond to the capacity metric 412 of FIG. 4. In such implementations, selecting the modulation order also includes selecting the modulation order from a set of modulation orders in accordance with the capacity metric. Each modulation order of the set of modulation orders is associated with a respective capacity threshold. For example, the UE 700 may select the modulation order 408 from a set of predefined modulation orders in accordance with the capacity metric 412 and capacity metrics associated with the set of predefined modulation orders, as described with reference to FIG. 4.

In some implementations, the process 600 further includes receiving, from the network node, an indicator associated with a channel aware modulation mode. The one or more channel-related parameters are transmitted in accordance with the reception of the indicator. For example, the indicator may include or correspond to the CAM mode indicator 470 of FIG. 4.

FIG. 8 is a flow diagram illustrating an example process 800 that supports channel aware modulation order selection in accordance with the present disclosure. Operations of the process 800 may be performed by a network node, such as the network node 105 described above with reference to FIGS. 1-5. For example, example operations of the process 800 may enable a network node to perform channel aware modulation order selection.

FIG. 9 is a block diagram of an example network node 900 that supports channel aware modulation order selection in accordance with the present disclosure. The network node 900 may be configured to perform operations, including the blocks of the process 800 described with reference to FIG. 8, to perform channel aware modulation order selection. In some implementations, the network node 900 includes the structure, hardware, and components shown and described with reference to the network node 105 of FIG. 2 or 4. For example, the network node 900 may include the controller 240, which operates to execute logic or computer instructions stored in the memory 242, as well as controlling the components of the network node 900 that provide the features and functionality of the network node 900. The network node 900, under control of the controller 240, transmits and receives signals via wireless radios 901*a*-*t* and the antennas 234*a*-*t*. The wireless radios 901*a*-*t* include various components and hardware, as illustrated in FIG. 2 for the network node 105, including the modems 232*a*-*t*, the transmit processor 220, the TX MIMO processor 230, the MIMO detector 236, and the receive processor 238.

As shown, the memory 242 may include the CAM mode manager 152, network parameters 902, a modulation order 903, and a bitset 904. Although illustrated in FIG. 9 as being included in the memory 242, in other implementations, the CAM mode manager 152 may be a separate component of the network node 900. The CAM mode manager 152 may be configured to manage one or more operations supporting channel aware modulation selection, such as receiving channel-related parameters from a UE, transmitting the network parameters 902 to the UE, selecting the modulation order 903 in accordance with the received channel-related parameters and the network parameters 902, and modulating the bitset 904 in accordance with the modulation order 903 to generate a modulated bitstream for transmission to the UE. The network parameters 902 may include or correspond to the network parameters 954 of FIG. 4, the modulation order 903 may include or correspond to the modulation order 456 of FIG. 4, and the bitset 904 may include or correspond to the bitset 458 of FIG. 4. The network node 900 may receive signals from or transmit signals to one or more UEs, such as the UE 115 of FIGS. 1-5 or the UE 700 of FIG. 7.

Referring back to the process 800 of FIG. 8, in block 802, the network node 900 transmits, to a UE, an indicator associated with a channel aware modulation mode. For example, the indicator may include or correspond to the CAM mode indicator 470 of FIG. 4. In block 804, the network node 900 receives, from the UE and in accordance with the transmission of the indicator, one or more channel-related parameters associated with a wireless channel between the UE and the network node. For example, the one or more channel-related parameters may include or correspond to the channel-related parameters 406 of FIG. 4. In some implementations, the wireless channel includes an uplink channel from the UE to the network node 900 having reciprocity with a downlink channel from the network node 900 to the UE.

In block 806, the network node 900 transmits, to the UE, one or more network parameters. For example, the one or more network parameters may include or correspond to the network parameters 454 of FIG. 4. In block 808, the network node 900 selects a modulation order in accordance with the one or more channel-related parameters and the one or more network parameters. For example, the modulation order may include or correspond to the modulation order 456 of FIG. 4.

In block 810, the network node 900 modulates a bitset in accordance with the modulation order to generate a modulated bitstream. For example, the bitset may include or correspond to the bitset 458. In block 812, the network node 900 transmits, to the UE, the modulated bitstream. For example, the modulated bitstream may include or correspond to the modulated bitstream 472 of FIG. 4. In some implementations, the modulated bitstream is transmitted via a PDCCH and the demodulated bitset includes control information.

In some implementations, the one or more channel-related parameters include a noise power associated with a receive antenna of the UE, a SNR across one or more REs of the wireless channel, a mutual information value associated with transmission and reception via the wireless channel, or a combination thereof. Additionally, or alternatively, the one or more network parameters may include a guard gap threshold, a transmit signal power associated with the network node, or a combination thereof. Additionally, or alternatively, the modulation order may include QPSK, QAM-8, QAM-16, QAM-32, QAM-64, or QAM-128.

In some implementations, the process 800 further includes receiving, from the UE, demodulation capability information including a demodulator type, a demodulator implementation loss, or a combination thereof. For example, the demodulation capability information may include or correspond to the demodulation capability information 474 of FIG. 4. In such implementations, the process 800 also includes selecting the modulation order further in accordance with the demodulation capability information. For example, the network node 900 may select the modulation order 456 in accordance with the channel-related parameters 406, the network parameters 454, and the demodulation capability information 474, as described with reference to FIG. 4.

In some implementations, selecting the modulation order includes determining a capacity metric associated with the wireless channel in accordance with the one or more channel-related parameters and the one or more network parameters. For example, the capacity metric may include or correspond to the capacity metric 460 of FIG. 4. In such implementations, selecting the modulation order also includes selecting the modulation order from a set of modulation orders in accordance with the capacity metric. Each modulation order of the set of modulation orders is associated with a respective capacity threshold. For example, the network node 900 may select the modulation order 456 from a set of predefined modulation orders in accordance with the capacity metric 460 and capacity metrics associated with the set of predefined modulation orders, as described with reference to FIG. 4.

It is noted that one or more blocks (or operations) described with reference to FIGS. 6 and 8 may be combined with one or more blocks (or operations) described with reference to another of the figures. For example, one or more blocks (or operations) of FIG. 6 may be combined with one or more blocks (or operations) of FIG. 8. As another example, one or more blocks associated with FIG. 6 or 8 may be combined with one or more blocks (or operations) associated with FIGS. 1-5. Additionally, or alternatively, one or more operations described above with reference to FIGS. 1-5 may be combined with one or more operations described with reference to FIG. 7 or 9.

In the following, further examples are described to facilitate the understanding of the disclosure.

According to Example 1, a UE for wireless communication includes a processing system that includes one or more processors and one or more memories coupled with the one or more processors. The processing system is configured to cause the UE to: transmit, to a network node, one or more channel-related parameters associated with a wireless channel between the UE and the network node; receive, from the network node, one or more network parameters; select a modulation order in accordance with the one or more channel-related parameters and the one or more network parameters; receive, from the network node and in accordance with the transmission of the one or more channel-related parameters, a modulated bitstream; and demodulate the modulated bitstream in accordance with the modulation order to generate a demodulated bitset.

Example 2 includes the UE of Example 1, wherein the modulated bitstream is received via a PDCCH, and wherein the demodulated bitset includes control information.

Example 3 includes the UE of Example 1 or Example 2, wherein the one or more channel-related parameters include a noise power associated with a receive antenna of the UE, a SNR across one or more REs of the wireless channel, a mutual information value associated with transmission and reception via the wireless channel, or a combination thereof.

Example 4 includes the UE of any of Examples 1 to 3, wherein the one or more network parameters include a guard gap threshold, a transmit signal power associated with the network node, or a combination thereof.

Example 5 includes the UE of any of Examples 1 to 4, wherein the processing system is further configured to cause the UE to: transmit, to the network node, demodulation capability information including a demodulator type, a demodulator implementation loss, or a combination thereof; and select the modulation order further in accordance with the demodulation capability information.

Example 6 includes the UE of any of Examples 1 to 5, wherein, to cause the UE to select the modulation order, the processing system is configured to cause the UE to: determine a capacity metric associated with the wireless channel in accordance with the one or more channel-related parameters and the network one or more parameters; and select the modulation order from a set of modulation orders in accordance with the capacity metric, wherein each modulation order of the set of modulation orders is associated with a respective capacity threshold.

Example 7 includes the UE of any of Examples 1 to 6, wherein the modulation order includes QPSK, QAM-8, QAM-16, QAM-32, QAM-64, or QAM-128.

Example 8 includes the UE of any of Examples 1 to 7, wherein the processing system is further configured to cause the UE to: receive, from the network node, an indicator associated with a channel aware modulation mode, wherein the UE is configured to transmit the one or more channel-related parameters in accordance with the reception of the indicator.

According to Example 9, a method of wireless communication by a UE includes transmitting, to a network node, one or more channel-related parameters associated with a wireless channel between the UE and the network node; receiving, from the network node, one or more network parameters; selecting a modulation order in accordance with the one or more channel-related parameters and the one or more network parameters; receiving, from the network node and in accordance with the transmission of the one or more channel-related parameters, a modulated bitstream; and demodulating the modulated bitstream in accordance with the modulation order to generate a demodulated bitset.

Example 10 includes the method of Example 9, wherein the modulated bitstream is received via a PDCCH, and wherein the demodulated bitset includes control information.

Example 11 includes the method of Example 9 or Example 10, wherein the one or more channel-related parameters include a noise power associated with a receive antenna of the UE, a SNR across one or more REs of the wireless channel, a mutual information value associated with transmission and reception via the wireless channel, or a combination thereof.

Example 12 includes the method of any of Examples 9 to 11, wherein the one or more network parameters include a guard gap threshold, a transmit signal power associated with the network node, or a combination thereof.

Example 13 includes the method of any of Examples 9 to 12, further including: transmitting, to the network node, demodulation capability information including a demodulator type, a demodulator implementation loss, or a combination thereof; and selecting the modulation order further in accordance with the demodulation capability information.

Example 14 includes the method of any of Examples 9 to 13, wherein selecting the modulation order includes: determining a capacity metric associated with the wireless channel in accordance with the one or more channel-related parameters and the one or more network parameters; and selecting the modulation order from a set of modulation orders in accordance with the capacity metric, wherein each modulation order of the set of modulation orders is associated with a respective capacity threshold.

Example 15 includes the method of any of Examples 9 to 14, wherein the modulation order includes QPSK, QAM-8, QAM-16, QAM-32, QAM-64, or QAM-128.

Example 16 includes the method of any of Examples 9 to 15, further including: receiving, from the network node, an indicator associated with a channel aware modulation mode, wherein the one or more channel-related parameters are transmitted in accordance with the reception of the indicator.

According to Example 17, a network node for wireless communication includes a processing system that includes one or more processors and one or more memories coupled with the one or more processors. The processing system is configured to cause the network node to: transmit, to a UE, an indicator associated with a channel aware modulation mode; receive, from the UE and in accordance with the transmission of the indicator, one or more channel-related parameters associated with a wireless channel between the UE and the network node; transmit, to the UE, one or more network parameters; select a modulation order in accordance with the one or more channel-related parameters and the one or more network parameters; modulate a bitset in accordance with the modulation order to generate a modulated bitstream; and transmit, to the UE, the modulated bitstream.

Example 18 includes the network node of Example 17, wherein the modulated bitstream is transmitted via a PDCCH, and wherein the bitset includes control information.

Example 19 includes the network node of Example 17 or Example 18, wherein the one or more channel-related parameters include a noise power associated with a receive antenna of the UE, a SNR across one or more REs of the wireless channel, a mutual information value associated with transmission and reception via the wireless channel, or a combination thereof.

Example 20 includes the network node of any of Examples 17 to 19, wherein the one or more network parameters include a guard gap threshold, a transmit signal power associated with the network node, or a combination thereof.

Example 21 includes the network node of any of Examples 17 to 20, wherein the processing system is further configured to cause the network node to: receive, from the UE, demodulation capability information including a demodulator type, a demodulator implementation loss, or a combination thereof; and select the modulation order further in accordance with the demodulation capability information.

Example 22 includes the network node of any of Examples 17 to 21, wherein, to cause the network node to select the modulation order, the processing system is configured to cause the network node to: determine a capacity metric associated with the wireless channel in accordance with the one or more channel-related parameters and the one or more network parameters; and select the modulation order from a set of modulation orders in accordance with the capacity metric, wherein each modulation order of the set of modulation orders is associated with a respective capacity threshold.

Example 23 includes the network node of any of Examples 17 to 22, wherein the wireless channel includes an uplink channel from the UE to the network node having reciprocity with a downlink channel from the network node to the UE.

According to Example 24, a method of wireless communication by a network node includes transmitting, to a UE, an indicator associated with a channel aware modulation mode; receiving, from the UE and in accordance with the transmission of the indicator, one or more channel-related parameters associated with a wireless channel between the UE and the network node; transmitting, to the UE, one or more network parameters; selecting a modulation order in accordance with the one or more channel-related parameters and the one or more network parameters; modulating a bitset in accordance with the modulation order to generate a modulated bitstream; and transmitting, to the UE, the modulated bitstream.

Example 25 includes the method of Example 24, wherein the modulated bitstream is transmitted via a PDCCH, and wherein the bitset includes control information.

Example 26 includes the method of Example 24 or Example 25, wherein the one or more channel-related parameters include a noise power associated with a receive antenna of the UE, a SNR across one or more REs of the wireless channel, a mutual information value associated with transmission and reception via the wireless channel, or a combination thereof.

Example 27 includes the method of any of Examples 24 to 26, wherein the one or more network parameters include a guard gap threshold, a transmit signal power associated with the network node, or a combination thereof.

Example 28 includes the method of any of Examples 24 to 27, further including: receiving, from the UE, demodulation capability information including a demodulator type, a demodulator implementation loss, or a combination thereof; and selecting the modulation order further in accordance with the demodulation capability information.

Example 29 includes the method of any of Examples 24 to 28, wherein selecting the modulation order includes: determining a capacity metric associated with the wireless channel in accordance with the one or more channel-related parameters and the one or more network parameters; and selecting the modulation order from a set of modulation orders in accordance with the capacity metric, wherein each modulation order of the set of modulation orders is associated with a respective capacity threshold.

Example 30 includes the method of any of Examples 24 to 29, wherein the wireless channel includes an uplink channel from the UE to the network node having reciprocity with a downlink channel from the network node to the UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logics, logical blocks, modules, circuits, and algorithm processes described in connection with the disclosure herein may be implemented as electronic hardware, computer software, or combinations of both. To clearly illustrate this interchangeability of hardware and software, various illustrative components, blocks, modules, circuits, and processes have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include random access memory (RAM), read-only memory (ROM), electronically erasable programable ROM (EEPROM), compact disc (CD) ROM (CD-ROM), or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product or a computer-readable storage device.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted can be incorporated in the example processes that are schematically illustrated. For example, one or more additional operations can be performed before, after, simultaneously with, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

No element, act, or instruction used herein should be construed as critical or essential unless explicitly described as such. Also, as used herein, the articles "a" and "an" are intended to include one or more items and may be used interchangeably with "one or more." It should be understood that "one or more" is equivalent to "at least one." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Similarly, the phrase "in accordance with" is intended to mean "based on or otherwise in association with" unless explicitly stated otherwise.

The previous description of the disclosure is provided to enable any person skilled in the art to make or use the disclosure. Various modifications to the implementations described in this disclosure may be readily apparent to those skilled in the art, and the generic principles defined herein may be applied to other variations without departing from the scope of this disclosure. Thus, the disclosure is not intended to be limited to the examples and designs described herein but is to be accorded the widest scope consistent with the principles and novel features disclosed herein.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A user equipment (UE) for wireless communication, comprising:

a plurality of antennas; and a processing system coupled with the plurality of antennas that includes one or more processors and one or more memories coupled with the one or more processors, the processing system configured to cause the UE to:

wirelessly transmit, to a network node via the plurality of antennas, one or more channel-related parameters associated with a wireless channel between the UE and the network node;

wirelessly receive, from the network node via the plurality of, one or more network parameters;

select a modulation order in accordance with the one or more channel-related parameters and the one or more network parameters;

wirelessly receive, from the network node via the plurality of antennas and in accordance with the transmission of the one or more channel-related parameters, a modulated bitstream via a physical downlink control channel (PDCCH); and demodulate the modulated bitstream in accordance with the modulation order to generate a demodulated bitset that comprises control information.

2. The UE of claim 1, wherein the one or more network parameters comprise a guard gap threshold, a transmit signal power associated with the network node, or a combination thereof.

3. The UE of claim 1, wherein the processing system is further configured to cause the UE to:

wirelessly transmit, to the network node via the plurality of antennas, demodulation capability information comprising a demodulator type, a demodulator implementation loss, or a combination thereof; and select the modulation order further in accordance with the demodulation capability information.

4. The UE of claim 1, wherein, to cause the UE to select the modulation order, the processing system is configured to cause the UE to:

determine a capacity metric associated with the wireless channel in accordance with the one or more channel-related parameters and the one or more network parameters; and select the modulation order from a set of modulation orders in accordance with the capacity metric, wherein each modulation order of the set of modulation orders is associated with a respective capacity threshold.

5. The UE of claim 1, wherein the modulation order comprises quadrature phase shift keying (QPSK), 8 quadrature amplitude modulation (QAM-8), 16 quadrature amplitude modulation (QAM-16), 32 quadrature amplitude modulation (QAM-32), 64 quadrature amplitude modulation (QAM-64), or 128 quadrature amplitude modulation (QAM-128).

6. The UE of claim 1, wherein the processing system is further configured to cause the UE to:

wirelessly receive, from the network node via the plurality of antennas, an indicator associated with a channel aware modulation mode, wherein the UE is configured to transmit the one or more channel-related parameters in accordance with the reception of the indicator.

7. A method of wireless communication by a user equipment (UE), comprising:

wirelessly transmitting, to a network node via a plurality of antennas, one or more channel-related parameters associated with a wireless channel between the UE and the network node;

wirelessly receiving, from the network node via the plurality of antennas, one or more network parameters;

selecting a modulation order in accordance with the one or more channel-related parameters and the one or more network parameters;

wirelessly receiving, from the network node via the plurality of antennas and in accordance with the transmission of the one or more channel-related parameters, a modulated bitstream via a physical downlink control channel (PDCCH); and demodulating the modulated bitstream in accordance with the modulation order to generate a demodulated bitset that comprises control information.

8. The method of claim 7, wherein the one or more network parameters comprise a guard gap threshold, a transmit signal power associated with the network node, or a combination thereof.

9. The method of claim 7, further comprising:

wirelessly transmitting, to the network node via the plurality of antennas, demodulation capability information comprising a demodulator type, a demodulator implementation loss, or a combination thereof; and selecting the modulation order further in accordance with the demodulation capability information.

10. The method of claim 7, wherein selecting the modulation order comprises:

determining a capacity metric associated with the wireless channel in accordance with the one or more channel-related parameters and the one or more network parameters; and selecting the modulation order from a set of modulation orders in accordance with the capacity metric, wherein each modulation order of the set of modulation orders is associated with a respective capacity threshold.

11. The method of claim 7, wherein the modulation order comprises quadrature phase shift keying (QPSK), 8 quadrature amplitude modulation (QAM-8), 16 quadrature amplitude modulation (QAM-16), 32 quadrature amplitude modulation (QAM-32), 64 quadrature amplitude modulation (QAM-64), or 128 quadrature amplitude modulation (QAM-128).

12. The method of claim 7, further comprising:

wirelessly receiving, from the network node via the plurality of antennas, an indicator associated with a channel aware modulation mode, wherein the one or more channel-related parameters are transmitted in accordance with the reception of the indicator.

13. A network node for wireless communication, comprising:

a plurality of antennas; and a processing system coupled with the plurality of antennas that includes one or more processors and one or more memories coupled with the one or more processors, the processing system configured to cause the network node to:

wirelessly transmit, to a user equipment (UE) via the plurality of antennas, an indicator associated with a channel aware modulation mode;

wirelessly receive, from the UE via the plurality of antennas and in accordance with the transmission of the indicator, one or more channel-related parameters associated with a wireless channel between the UE and the network node;

wirelessly transmit, to the UE via the plurality of antennas, one or more network parameters;

select a modulation order in accordance with the one or more channel-related parameters and the one or more network parameters;

modulate a bitset that comprises control information in accordance with the modulation order to generate a modulated bitstream; and wirelessly transmit, to the UE via the plurality of antennas, the modulated bitstream via a physical downlink control channel (PDCCH).

14. The network node of claim 13, wherein the one or more network parameters comprise a guard gap threshold, a transmit signal power associated with the network node, or a combination thereof.

15. The network node of claim 13, wherein the processing system is further configured to cause the network node to:

wirelessly receive, from the UE via the plurality of antennas, demodulation capability information comprising a demodulator type, a demodulator implementation loss, or a combination thereof; and select the modulation order further in accordance with the demodulation capability information.

16. The network node of claim 13, wherein, to cause the network node to select the modulation order, the processing system is configured to cause the network node to:

determine a capacity metric associated with the wireless channel in accordance with the one or more channel-related parameters and the one or more network parameters; and select the modulation order from a set of modulation orders in accordance with the capacity metric, wherein each modulation order of the set of modulation orders is associated with a respective capacity threshold.

17. The network node of claim 13, wherein the wireless channel comprises an uplink channel from the UE to the network node having reciprocity with a downlink channel from the network node to the UE.

18. A method of wireless communication by a network node, comprising:

wirelessly transmitting, to a user equipment (UE) via the plurality of antennas, an indicator associated with a channel aware modulation mode;

wirelessly receiving, from the UE via the plurality of antennas and in accordance with the transmission of the indicator, one or more channel-related parameters associated with a wireless channel between the UE and the network node;

wirelessly transmitting, to the UE via the plurality of antennas, one or more network parameters;

select a modulation order in accordance with the one or more channel-related parameters and the one or more network parameters;

modulate a bitset that comprises control information in accordance with the modulation order to generate a modulated bitstream; and wirelessly transmitting, to the UE via the plurality of antennas, the modulated bitstream via a physical downlink control channel (PDCCH).

19. The method of claim 18, wherein the one or more network parameters comprise a guard gap threshold, a transmit signal power associated with the network node, or a combination thereof.

20. The method of claim 18, further comprising:

wirelessly receiving, from the UE via the plurality of antennas, demodulation capability information comprising a demodulator type, a demodulator implementation loss, or a combination thereof; and selecting the modulation order further in accordance with the demodulation capability information.

21. The method of claim 18, wherein selecting the modulation order comprises:

determining a capacity metric associated with the wireless channel in accordance with the one or more channel-related parameters and the one or more network parameters; and selecting the modulation order from a set of modulation orders in accordance with the capacity metric, wherein each modulation order of the set of modulation orders is associated with a respective capacity threshold.

22. The method of claim 18, wherein the wireless channel comprises an uplink channel from the UE to the network node having reciprocity with a downlink channel from the network node to the UE.

* * * * *